United States Patent [19]
Tamura et al.

[11] Patent Number: 5,144,843
[45] Date of Patent: Sep. 8, 1992

[54] PRESSURE SENSOR

[75] Inventors: Morio Tamura, Tsutiura; Fujio Sato, Tsukuba; Hisayoshi Hashimoto, Ushiku; Ken Ichiryu; Kazuyoshi Hatano, both of Ibaraki; Kiyoshi Tanaka, Mizukaido; Nobuyuki Tobita, Mito, all of Japan

[73] Assignee: Hitachi Construction Machinery Co., Ltd., Tokyo, Japan

[21] Appl. No.: 474,765

[22] PCT Filed: Jul. 26, 1989

[86] PCT No.: PCT/JP89/00745
§ 371 Date: Mar. 21, 1990
§ 102(e) Date: Mar. 21, 1990

[87] PCT Pub. No.: WO90/01153
PCT Pub. Date: Feb. 8, 1990

[30] Foreign Application Priority Data
Jul. 26, 1988 [JP] Japan .............. 63-98647[U]
Jun. 7, 1989 [JP] Japan .............. 1-144388
Jun. 27, 1989 [JP] Japan .............. 1-75491[U]

[51] Int. Cl.$^5$ .................................................. G01L 9/06
[52] U.S. Cl. ........................................ 73/727; 73/721; 338/4; 338/42
[58] Field of Search ............. 73/727, 726, 720, 721; 338/4, 42; 29/621.1

[56] References Cited

U.S. PATENT DOCUMENTS

| | | | |
|---|---|---|---|
| 3,935,636 | 2/1976 | Mermelstein | 29/619 |
| 4,600,912 | 7/1986 | Marks et al. | 338/4 |
| 4,665,754 | 5/1987 | Glenn et al. | 73/727 |
| 4,884,051 | 11/1989 | Takahashi et al. | 338/4 |

FOREIGN PATENT DOCUMENTS

| | | |
|---|---|---|
| 42-8356 | 4/1967 | Japan . |
| 52-45295 | 4/1977 | Japan . |
| 53-23677 | 7/1978 | Japan . |
| 58-3081 | 1/1983 | Japan . |
| 61-70716 | 4/1986 | Japan . |
| 61-140934 | 9/1986 | Japan . |
| 61-262905 | 11/1986 | Japan . |
| 63-76484 | 4/1988 | Japan . |

Primary Examiner—Donald O. Woodirl
Attorney, Agent, or Firm—Fay, Sharpe, Beall, Fagan, Minnich & McKee

[57] ABSTRACT

A pressure sensor has a thin plate diaphragm having a strain detecting section thereon, and a support member for receiving and properly positioning the diaphragm within a stepped bore structure. The pressure sensor with which the strain detecting section is formed on the diaphragm surface is formed by the use of semiconductor manufacture technology by making the diaphragm of the pressure sensor in the form of a thin plate member. The diaphragm and the support member are joined together by diffusion bonding, and heat treatment for this diffusion bonding is also utilized to crystallize the semiconductor strain gauges.

7 Claims, 17 Drawing Sheets

5,144,843

PRESSURE SENSOR

Description

1. Technical Field

The present invention relates to a pressure sensor which has a structure suitable for mounting to components of hydraulic machines, i.e., hydraulic equipment such as hydraulic pipes and couplings (joints) for the hydraulic pipes, and which has a diaphragm positioned such that strain gauges in a strain detecting section provided on the diaphragm take an optimum location for high measurement accuracy, a pressure sensor manufacturing method by which the pressure sensor can simply be manufactured in a mass quantity by utilizing semiconductor manufacture technology, and to hydraulic equipment which is produced with the structure allowing the pressure sensor to be incorporated therein in advance for high practicability.

2. Background Art

Pressure sensors are one sort of sensors contained in the category of stress sensors in a broad sense that conceptually includes strain sensors, torque sensors, load sensors, etc., and are employed for measuring a pressure of a liquid, gas, etc. Such pressure sensors are often used as detector means for detecting working hydraulic pressures at various mechnical components in hydraulic machines for civil engineering and construction, for example. Pressure sensors may have various types of the structure. A pressure sensor of the diaphragm type will be described below.

The structure of a conventional diaphragm type pressure sensor is shown in FIG. 39. The pressure sensor comprises a metal-made diaphragm base 300 which is directly subjected to a pressure P, e.g., a hydraulic pressure, an insulting film 301 formed by a film forming technique, such as CVD, using silane gas or the like, four strain gauges 302 each of which has a resistance value changed dependent on a strain of the diaphragm caused by the pressure P, thin film conductors 302 serving as terminals for electric wiring, and a passivation film 304 which functions as a hermetic protection film. The metal-made diaphragm base 300 is functionally divided into to two parts. One part is a diaphragm section 305 subjected to the pressure P for developing a strain dependent on the magnitude of the pressure, and another part is a tubular support section 306 which functions to support the diaphragm section 305 and fix the pressure sensor at a certain mounting location. The diaphragm section 305 is formed at a top position of the tubular support section 306 so as to close one end face thereof. The strain gauge 302 and the thin film conductors 303 are covered by the passivation film 304 such as a $SiN_x$ or $SiO_2$ film. Wires 307, 307 are connected at their lower ends to the thin film conductors 303, 303, respectively, as viewed on the drawing. The other ends of the wires 307 are connected to an electrical measuring unit such as a voltage meter or ampere meter via lead wires (not shown) for electrically measuring a strain developed in the diaphragm section 305. More specifically, in the no-load condition where the pressure P does not act on the diaphragm section 305, the specific resistances of the strain gauges 302 remain unchanged so that no potential difference occurs between the wires 307 and 307 and no current flows into the measuring unit. On the other hand, when a strain is developed in the diaphragm section 305 upon being subjected to the pressure P, the specific resistances of the strain gauges 302 are changed to produce a potential difference between the wires 307 and 307, whereby the measuring unit can determine the pressure applied to the diaphragm section 305.

In the pressure sensor having the structure shown in FIG. 39, the diaphragm section 305 and the support section 306 are integrally structured into the metal-made diaphragm base 300. Conventionally, however, there has also been proposed a pressure sensor in which the diaphragm section 305 and the support section 306 are structured as separate members, are disclosed in Japanese Utility Model Laid-Open 61(1986)-137242 by way of example. In this type pressure sensor, the diaphragm section 305 is formed into a metal-made thin plate diaphragm as an independent member by itself, and then welded to a metal-made tubular body as a support member. Taking into account the situation where the pressure sensor is practically used, the support section 306 is required to relate to the object to which the pressure sensor is mounted. Accordingly, even in the pressure sensor of the type where the diaphragm section 305 and the support section 306 are structured as separate members, a support element for supporting a diaphragm is indispensable. A separate support member is necessarily added to the pressure sensor to finally provide substantially the same structure as that of the pressure sensor shown in FIG. 39. Then, the semiconductor manufacture technology is applied to a combined assembly of the thin plate diaphragm and the tubular member for forming semiconductor strain gauges on the upper surface of the diaphragm.

The strain gauges 302 may be each a metallic strain gauge or semiconductor strain gauge. In particular, use of the semiconductor strain gauge has recently become widespread because it has a higher gauge rate, develops a larger change in the resistance value dependent on small mechanical strain, and hence provides higher accuracy in pressure measurement than the metallic strain gauge. The strain gauge 302 shown in FIG. 39 is a thin film semiconductor strain gauge formed on the upper surface of the insulating film 301. The strain gauge disclosed in Japanese Utility Model Laid-Open 61(1986)-137242 is also a semiconductor strain gauge, as mentioned above. The strain gauge is fabricated, for example, by forming a silicon thin film for the gauge, which includes an impurity such as phosphor or boron, on the insulating film 301 with the plasma CVD, and then patterning the silicon thin film with the photolithography, thereby to produce a piezo resistance element of which specific resistance is changed when strained upon receiving an external force. The thin film conductors as the terminals 303 are fabricated, for example, by forming thin films made of a high conductive material, such as gold, copper or aluminum, with the vacuum vapor deposition, and then forming patterns interconnecting the respective strain gauges 302 with the photolithography, thereby to constitute a Wheatstone bridge circuit. As described above, the insulting film 301, the strain gauges 302, the thin film conductors 303, and the passivation film 304 are all fabricated by application of the semiconductor manufacture technology. Thus, the semiconductor manufacture technology is utilized in producing pressure sensors equipped with semiconductor strain gauges.

Notwithstanding the above state of art, the pressure sensor having the structure of FIG. 39 has faced a problem when directly forming the strain gauges 302 or the like on the upper surface of the mental-made diaphragm base 300. Specifically, while the mental-made diaphragm base 300 has a thickness of about 3-6 mm, the strain detecting section including the strain gauges 302 and others is formed on the thin plate with a thickness less than 2 mm. Therefore, the thickness of the metal-made diaphragm base 300 imposes an obstacle to impede sufficient use of the semiconductor manufacture technology. Such a problem also occurs in the pressure sensor as disclosed in the above-cited Japanese Utility Model Laid-Open 61(1986)-137242 in which the diaphragm and the tubular body are fabricated as separate members. Specifically, when the semiconductor manufacture technology is applied to fabricate the strain gauges, the diaphragm and the tubular body are combined into the integral structure. As with the above-mentioned prior art, therefore, the disclosed pressure sensor has a certain substantial thickness, resulting in a similar problem that the semiconductor manufacture technology cannot sufficiently be utilized in fabricating the pressure sensor.

There will now be explained another problem wherein the conventional pressure sensors have difficulties in keeping high strain detecting sensitivity of the strain gauges in the diaphragm due to the specific structure thereof and the manufacture method restricted by that structure, as well as in positioning the strain gauges, which leads to the reduced positioning accuracy.

In the pressure sensor shown in FIG. 39, the metal-made diaphragm base 300 is fabricated by machining into a substantially channel-like shape in cross section, and the four strain gauges 302 are formed on a strain causing area of the diaphragm section 305. Since the strain gauges 302 are each formed by the semiconductor film forming technology as a very thin film less than/or equal to 2 $\mu$m, the diaphragm section 305, require to be formed to have a uniform thickness with high accuracy, in order to maintain capability of the semiconductor strain gauges 302 which are intrinsically endowed with high strain detecting sensitivity. But, it is difficult to meet such a requirement by the machining technique currently used.

Further, for the purpose of effectively developing specific high strain detecting sensitivity, it is desired that the four strain gauges 302 are arranged with possibly maximum distances therebetween in the strain causing area presumably defined by the inner diameter of the tubular support section 306 on the upper surface of the pressure diaphragm section 305. With the conventional machining technique, however, round edges remain at the ceiling corners of a bore when the diaphragm base 300 is bored from the lower side in the drawing, as a result of which machining accuracy cannot be enhanced. Therefore, the strain causing area of the diaphragm section 305 cannot strictly be defined by only a dimension of the inner diameter of the support section 306, making it hard to position the strain gauges 302 with high accuracy. This necessarily results in that the strain gauges of the pressure sensor manufactured with the above-mentioned structure are lowered in positioning accuracy.

In the pressure sensor as disclosed in the above-cited Japanese Utility Model Laid-Open 61(1986)-137242, the thin plates as a diaphragm and the tubular body as a support member are fabricated separately, followed by welding the thin plate and the tubular body to each other. The strain gauges are then formed on the upper surface of the thin plate. The thin plate can be machined so as to have a uniform thickness because it is singly fabricated from a thin plate member having a strain causing area. However, the thin plate is then joined by welding to the tubular body fabricated as a separate member, whereupon the strain causing area of the thin plate is deformed due to, e.g., heat applied in the welding step. The resulting error makes it impossible to strictly define a dimension of the strain causing area in the final pressure sensor. Therefore, the strain gauges formed on the strain causing area are difficult to position with high accuracy, and lowered in the positioning accuracy.

Considering pressure sensors from the standpoint of the user with much importance paid to use of the pressure sensors, there are problems as follow. In any case, the structure of a pressure sensor must be determined, taking into account circumstances of the location where it is to be mounted. In the normal mounted condition of the pressure sensor, the support member for supporting the diaphragm section is required to serve a double purpose of installing the diaphragm section and protecting it from any disturbance, i.e., a deforming force. Taking the conventional pressure sensor shown in FIG. 39 from such a viewpoint, since the diaphragm section 305 and the support section 306 are fabricated integrally into the mental-made diaphragm base 300 in advance by manufacturers without considering circumstances in which the pressure sensor is to be employed, it cannot be said that this type pressure sensor is convenient for users who attempt to utilize it. Furthermore, the form of the support section 306 of the mental-made diaphragm base 300 and the structure of the pressure sensor itself are generally standardized by manufacturers and not always optimum for circumstances in which the pressure sensor is to be employed by the user.

SUMMARY OF THE INVENTION

A first object of the present invention is to provide a pressure sensor and a manufacture method for the pressure sensor, which sensor has the structure that allows a strain causing area to be definitely defined on a diaphragm subjected to a pressure, and allows a plurality of semiconductor strain gauges each having high detecting sensitivity to be formed on the strain causing area with positioning accuracy high enough to fully develop their own capability, and by which method the pressure sensor adopting that structure can be manufactured in a mass quantity through a simple film forming process by effective use of the semiconductor manufacture technology.

A second object of the present invention is to provide a pressure sensor which is structured such that a thin plate diaphragm is installed into a stepped bore of a metal-made support member to position the diaphragm by the stepped bore with high accuracy. The diaphragm is firmly supported by the support member in mounting the pressure sensor to hydraulic equipment or the like, thereby to make the pressure sensor adaptable for detection of a high pressure, and hence which has the optimum structure for mounting to a wall of the hydraulic equipment because a fixing force is not directly applied to the diaphragm even when the pressure sensor is fixed to the equipment wall.

A third object of the present invention is to provide a pressure sensor which is structured such that the pressure sensor has a single thin plate diaphragm including a strain detecting section formed of strain gauges and others, and different pressures are applied to the opposite sides of the diaphragm, and hence which can achieve a differential pressure sensor having good response and simple construction with the single diaphragm.

A fourth object of the present invention is to provide a manufacture method for a pressure sensor with which the semiconductor manufacture technology is effectively applied to a diaphragm singly fabricated in the form of a thin plate, thereby permitting manufacture of a pressure sensor that a strain detecting section including semiconductor strain gauges and others is formed on a strain causing area of the diaphragm with high positioning accuracy, and which can simply manufacture such a pressure sensor having high positioning accuracy in a mass quantity.

A fifth object of the present invention is to provide a manufacture method for a pressure sensor with which the pressure sensor can be produced through the simplified manufacture process by utilizing the semiconductor manufacture technology while also permitting diffusion bonding and crystallization of amorphous strain gauges to be performed with single heat treatment.

A sixth object of the present invention is to provide hydraulic equipment with a pressure sensor which can be mounted with a simple construction that is fabricated into the form presenting no problem in appearance, which makes it possible to freely select the position of measuring a hydraulic pressure, etc., and which can perform pressure measurement with high reliability at the reduced cost.

A first pressure sensor according to the present invention is constructed such that the pressure sensor comprises a diaphragm shaped into the form of a thin plate, having a strain detecting section provided on one surface, and using at least one surface as a pressure receiving surface, and a support member having a larger-diameter bore and a smaller-diameter bore formed in continuous and coaxial relation to the larger-diameter bore, wherein the larger-diameter bore receives the diaphragm, the inner wall surface of the larger-diameter bore determines an installed position of the diaphragm relative to the smaller-diameter bore in accordance with the positional relationship of limiting a position of the outer edge of the diaphragm, the smaller-diameter bore defines a dimension of a strain causing area of the diaphragm, a stepped portion formed between the larger-diameter bore and the smaller-diameter bore provides a bonding surface to be bonded to the diaphragm, and a pressure medium is introduced to the pressure receiving surface of the diaphragm placed in the larger-diameter bore.

A second pressure sensor according to the present invention is constructed, in addition to the above first construction, such that the diaphragm is positioned relative to the smaller-diameter bore by bringing the outer edge of the diaphragm into contact with the inner wall surface of the larger-diameter bore.

A third pressure sensor according to the present invention is constructed, in addition to the above first construction, such that the diaphragm is shaped into the form of a rectangular thin plate, and the diaphragm is positioned in accordance with the positional relationship that the inner wall surface of the larger-diameter bore limits positions of respective apexes of the diaphragm.

A fourth pressure sensor according to the present invention is constructed, in addition to the above first construction, such that the diaphragm is joined to the support member by an adhesive.

A fifth pressure sensor according to the present invention is constructed, in addition to the above first construction, such that the diaphragm and the support member are both made of a metallic material, and the diaphragm is joined to the support member by diffusion bonding the peripheral surface of the diaphragm around the outer circumference of the strain detecting section to the surface of the stepped portion of the support member.

A sixth pressure sensor according to the present invention is constructed such that the pressure sensor comprises two diaphragms each shaped into the form of a thin plate, having a strain detecting section provided on one surface, and using the other surface as a pressure receiving surface, and a support member having two pairs of larger-diameter bores and smaller-diameter bores formed in continuous and coaxial relation to the larger-diameter bores, wherein each of the two pairs of larger-diameter bores receives one of the two diaphragms, the inner wall surface of each larger-diameter bore determines an installed position of each diaphragm relative to each smaller-diameter bore in accordance with the positional relationship of limiting a position of the outer edge of each diaphragm, each smaller-diameter bore defines a dimension of a strain causing area of each diaphragm, a stepped portion formed between each larger-diameter bore and each smaller-diameter bore provides a bonding surface to be bonded to each diaphragm, and pressure media under different levels of pressure are introduced to the pressure receiving surfaces of the diaphragms placed in the larger-diameter bores, whereby the pressure sensor is constituted as a differential pressure sensor.

A seventh pressure sensor according to the present invention is constructed such that the pressure sensor comprises a diaphragm shaped into the form of a thin plate, having a strain detecting section provided on one surface, and using both one surface and the other surface as pressure receiving surfaces, and a support member having a larger-diameter bore and a smaller-diameter bore formed in continuous and coaxial relation to the larger-diameter bore, wherein the larger-diameter bore receives the diaphragm, the inner wall surface of the larger-diameter bore determines an installed position of the diaphragm relative to the smaller-diameter bore in accordance with the positional relationship of limiting a position of the outer edge of the diaphragm, the smaller-diameter bore defines a dimension of a strain causing area of the diaphragm, a stepped portion formed between the larger-diameter bore and the smaller-diameter bore provides a bonding surface to be bonded to the diaphragm, and pressure media under different levels of pressure are introduced to one surface and the other surface of the diaphragm placed in the larger-diameter bores, whereby the pressure sensor is constituted as a differential pressure sensor.

A first manufacture method for a pressure sensor according to the present invention comprises a diaphragm forming step to form a thin plate diaphragm of a metallic material, an insulating film forming step to form an insulating film on one surface of the diaphragm near the center thereof, a silicon thin film forming step to form a silicon thin film in an amorphous state on the upper surface of the insulating film, a heat treating step to heat treat the amorphous silicon thin film for crystallization, a gauge pattern forming step to pattern the crystallized silicon thin film into strain gauges, and a joining step to join the diaphragm and a support member for receiving and positioning the diaphragm to each other.

A second manufacture method for a pressure sensor according to the present invention is provided by reversing the process sequence of the heat treating step and the gauge pattern forming step in the above manufacture method for the pressure sensor.

A third manufacture method for a pressure sensor according to the present invention comprises a diaphragm forming step to form a thin plate diaphragm of a metallic material, an insulating film forming step to form an insulating film over one surface of the diaphragm, a silicon thin film forming step to form a silicon thin film in an amorphous state on the upper surface of the insulating film, a heat treating step to heat treat the amorphous silicon thin film for crystallization, a gauge pattern forming step to pattern the crystallized silicon thin film into strain gauges, and a joining step to join the diaphragm and a support member for receiving and positioning the diaphragm.

A fourth manufacture method for a pressure sensor according to the present invention is provided by reversing the process sequence of the heat treating step and the gauge pattern forming step in the above manufacture method for the pressure sensor.

A fifth manufacture method for a pressure sensor according to the present invention comprises a substrate fabricating step to fabricate a thin plate substrate of a metallic material, the substrate having any desired area enough to form a plurality of diaphragms, a mask placing step to place a mask on the thin plate substrate for defining spaces in each of which a strain detecting section of each diaphragm is to be formed, an insulating film forming step to form an insulating film in each of the spaces defined by the mask on the upper surface of the thin plate substrate, a silicon thin film forming step to form a silicon thin film in an amorphous state on the upper surface of each insulating film, a mask removing step to remove the mask from the thin plate substrate, a heat treating step to heat treat each amorphous silicon thin film for crystallization, a gauge pattern forming step to pattern each crystallized silicon thin film into a plurality of strain gauges, a severing step to sever the thin plate substrate for each set of the plural strain gauges for forming a plurality of diaphragms each provided with a strain detecting section, and a joining step to join the diaphragm and a support member for receiving and positioning the diaphragm.

A sixth manufacture method for a pressure sensor according to the present invention is provided by reversing the process sequence of the heat treating step and the gauge pattern forming step in the above manufacture method for the pressure sensor.

A seventh manufacture method for a pressure sensor according to the present invention comprises a substrate fabricating step to fabricate a thin plate substrate of a metallic material, the substrate having any desired area enough to form a plurality of diaphragms, an insulating film forming step to form an insulating film on the upper surface of the thin plate substrate, a silicon thin film forming step to form a silicon thin film in an amorphous state on the upper surface of the insulating film, a heat treating step to heat treat the amorphous silicon thin film for crystallization, a gauge pattern forming step to pattern the crystallized silicon thin film into a plurality of strain gauges, a severing step to sever the thin plate substrate for each set of the plural strain gauges for forming a plurality of diaphragms each provided with a strain detecting section, and a joining step to join the diaphragm and a support member for receiving and positioning the diaphragm.

An eight manufacture method for a pressure sensor according to the present invention is provided by reversing the process sequence of the heat treating step and the gauge pattern forming step in the above manufacture method for the pressure sensor.

A ninth manufacture method for a pressure sensor according to the present invention comprises a diaphragm forming step to form a thin plate diaphragm of a metallic material, an isulating film forming step to form an insulating film on one surface of the thin plate diaphragm near the center thereof, a silicon thin film forming step to form a silicon thin film in an amorphous state on the upper surface of the insulating film, a gauge pattern forming step to pattern the silicon thin film into a plurality of amorphous strain gauges, and a heat treating step to concurrently heat treat a support member, the diaphragm and amorphous strain gauges for joining the diaphragm having the amorphous strain gauges patterned thereon and the support member for receiving and positioning the diaphragm to each other by diffusion bonding, as well as crystallizing the amorphous strain gauges on the diaphragm.

A tenth manufacture method for a pressure sensor according to the present invention comprises a substrate fabricating step to fabricate a thin plate substrate of a metallic material, the substrate having any desired area enough to form a plurality of diaphragms, a mask placing step to place a mask on the thin plate substrate for defining spaces in each of which a strain detecting section of each diaphragm is to be formed, an insulating film forming step to form an insulating film in each of the spaces defined by the mask on the upper surface of the thin plate substrate, a silicon thin film forming step to form a silicon thin film in an amorphous state on the upper surface face of each insulating film, a mask removing step to remove the mask from the thin plate substrate, a gauge pattern forming step to pattern each silicon thin film into a plurality of strain gauges, a severing step to sever the thin plate substrate for each set of the plural amorphous strain gauges for forming a plurality of diaphragms each provided with a strain detecting section, and a heat treating step to concurrently heat treat each support member, each diaphragm and the amorphous strain gauges for joining each diaphragm having the amorphous strain gauges patterned thereon and each support member for receiving and positioning each diaphragm to each other by diffusion bonding, as well as crystallizing the amorphous strain gauges on each diaphragm.

A hydraulic equipment with a pressure sensor according to the present invention is constructed, in a hydraulic equipment having a wall of which inner surface is in contact with a hydraulic fluid, such that a pressure sensor installing bore formed to extend from the outer wall surface to the inner wall surface of the wall, and a hydraulic fluid introducing bore formed in the wall to communicate the pressure sensor installing bore with the hydraulic fluid contact surface, wherein a pressure sensor comprising a diaphragm provided with a strain detecting section and a support member for receiving and positioning the diaphragm is disposed in the pressure sensor installing bore, and the support member is fixedly held by a retainer member to fix the pressure sensor in the pressure sensor installing bore of the wall.

BRIEF DESCRIPTION OF THE DRAWINGS

FIG. 5 is a vertical sectional view showing a state where the pressure sensor unit is mounted onto a wall or the like;

FIG. 27 is a vertical sectional view showing an embodiment in which the pressure sensor unit according to the present invention constituted as a differential pressure sensor is mounted onto a wall or the like;

BEST MODE FOR CARRYING OUT THE INVENTION

Hereinafter, embodiments of the present invention will be described with reference to the accompanying drawings.

Figure 1:
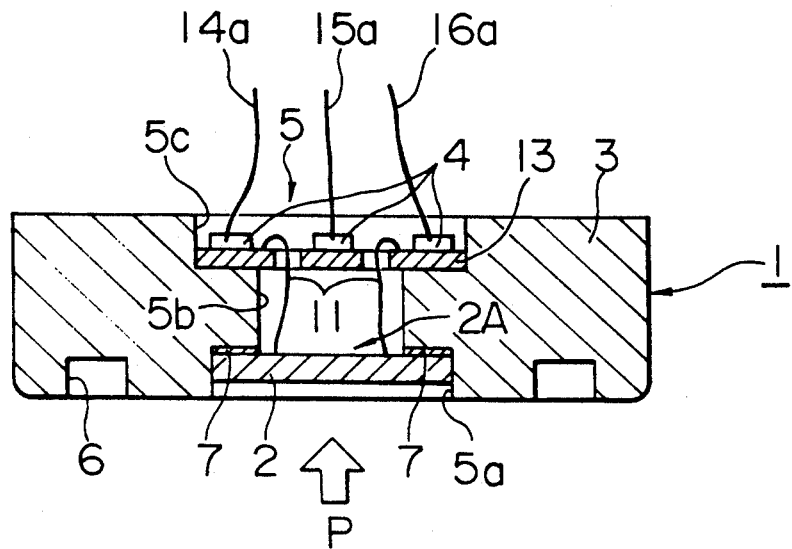
FIG. 1 is a vertical sectional view showing in enlarged scale the structure of a pressure sensor (a pressure sensor in a broad sense, referred to as a pressure sensor unit hereinafter and in the following embodiments) according to the present invention.

In FIG. 1, designated by reference numeral 1 is a pressure sensor unit according to a first embodiment of the present invention. The pressure sensor unit 1 comprises a metal-made diaphragm 2 having a strain causing area at the center thereof, a metal-made support member 3 for holding the metal-made diaphragm 2 placed and installed in a lower portion of the support member 3, and an electric circuit section 4 disposed in an upper portion of the support member 3. Thus, the pressure sensor unit 1 is comprised of the metal-made diaphragm 2, the metal-made support member 3 and the electric circuit section 4 as mentioned above, thereby constituting a pressure sensor in a broad sense. In the pressure sensor unit 1, a strain detecting section 2A comprised of semiconductor strain gauges and others is provided on the upper surface of the metal-made diaphragm 2. Thus, the metal-made diaphragm 2 and the strain detecting section 2A jointly constitute a pressure sensor 1A in a narrow sense. The support member 3 is substantially cylindrical in its external shape with a short axial length, and is formed in its portion along the central axis with a circular stepped bore 5 partially different in diameter. The support member 3 is generally made of a metal. The bore 5 comprises three portions; a circular recessed larger-diameter bore 5a formed in the lower side, a smaller-diameter bore 5b formed at the center, and a circular recessed larger-diameter bore 5c formed in the upper side, as viewed on the drawing, these three bore portions 5a, 5c, 5b being formed in coaxial positional relationship. The larger-diameter bore 5a provides a space in which the metal-made diaphragm 2 is placed and installed, the larger-diameter bore 5c provides a space in which the electric circuit section 4 is placed, and the smaller-diameter bore 5b provides a space in which an electric wiring is inserted. Also, a circular ring-like groove 6 is formed to surround the larger-diameter bore 5a in the lower surface of the support member 3 as shown in FIGS. 1 and 2.

Figure 2:
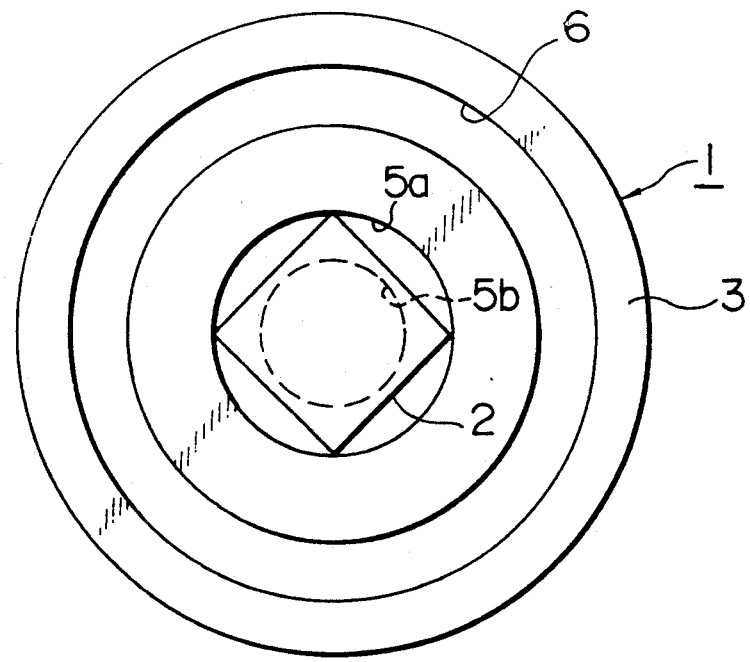
FIG. 2 is a bottom view of the pressure sensor unit shown in FIG. 1.

The diaphragm 2 is disposed in the larger-diameter bore 5a of the support member 3, and formed of a metal-made thin plate which is about 0.05–2 mm thick and has a square plan shape as shown in FIG. 2 by way of example. The diaphragm 2 may be, for example, of a metal such as SUS630 or any other rigid plate material. In this example, the diaphragm 2 is fabricated such that the diagonal of the diaphragm 2 has a length almost equal to the diameter of the larger-diameter bore 5a, whereby the diaphragm 2 is tightly fitted to be placed and installed in the larger-diameter bore 5a. Furthermore, the diaphragm 2 is firmly fixed at a peripheral portion of the upper surface thereof to the step surface of the larger-diameter bore 5a via a joined portion 7 by diffusion bonding. The diaphragm 2 and the larger-diameter bore 5a have their axes aligned with each other in a state where the former is installed in the latter.

With the above construction, the thin plate diaphragm 2 is placed in the larger-diameter bore 5a of the support member 3 and, in this state, the outer corner edges, i.e., four apexes, of the diaphragm 2 contact the inner wall surface of the larger-diameter bore 5a, causing the diaphragm 2 to be positioned in the larger-diameter bore 5a. As a result, the diaphragm 2 is high-accurately positioned in the support member 3 with respect to the smaller-diameter bore 5b formed in coaxial relation to the larger-diameter bore 5a. With the diaphragm 2 fixedly joined to the step surface of the larger-diameter bore 5a, as mentioned before, the remaining area of the diaphragm 2 which is not joined to the step surface serves as a strain causing area. Since that step surface is determined by the smaller-diameter bore 5b, high positioning accuracy of the diaphragm 2 with respect to the smaller-diameter bore 5b allows the strain causing area of the diaphragm 2 to be strictly defined in its dimension by the smaller-diameter bore 5b with high accuracy. Thus, the construction of the pressure sensor unit 1 according to the present invention makes it possible to strictly determined a dimension of the strain causing area in the diaphragm 2 by their own structures of the diaphragm 2 and the support member 3 which are designed to be adapted for the manufacture process of mounting the diaphragm 2 to the support member 3 and the accurate mounting thereof.

In the foregoing, the apexes of the diaphragm 2 are not all necessarily brought into contact with the inner wall surface of the larger-diameter bore 5a in positioning the diaphragm 2 in the support member 3. Even in a state where one or more apexes do not make contact, the strain causing area can be defined from the positional relationship relative to the smaller-diameter bore 5b, if the apexes of the diaphragm 2 are restricted in their positions by the inner wall surface based on the positional relationship between the respective apexes and the inner wall surface of the larger-diameter bore 5a so that the diaphragm 2 is placed within a given region in the larger-diameter bore 5a. Note that the plan form of the diaphragm 2 is not limited to a square shape, and may have any other circular or polygonal shape. In the case of a circular shape, the diaphragm has the circumferential edge. Although the diaphragm 2 has a thickness smaller than a depth of the larger-diameter bore 5a in the illustration of FIG. 1, both the dimensions can be made equal to each other.

Figure 3:
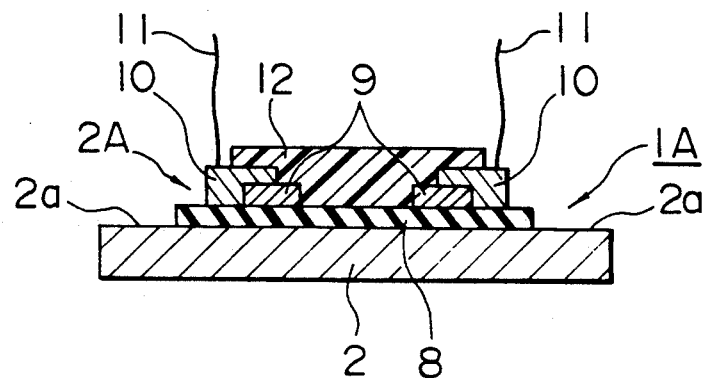
FIG. 3 is a vertical sectional view showing the structure of a pressure sensor in a narrow sense, with its strain detecting section enlarged.
Figure 39:
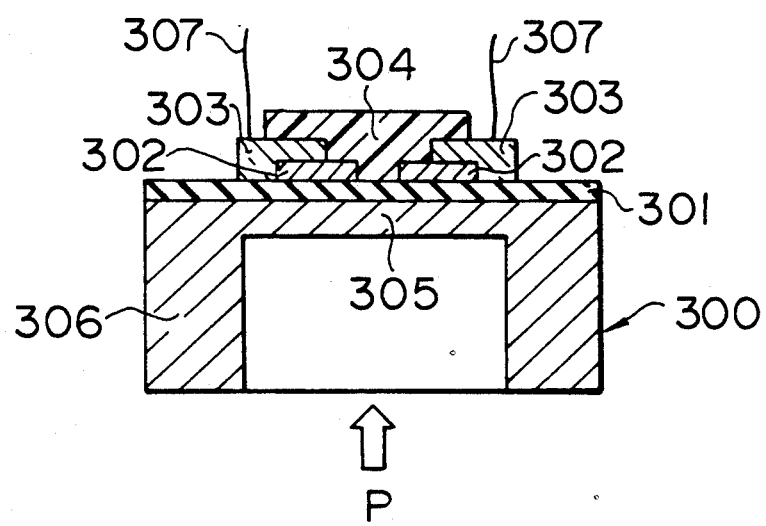
FIG. 39 is a vertical sectional view showing the structure of a conventional pressure sensor.

FIG. 3 shows in enlarged scale the structure of the strain detecting section 2A formed on the upper surface of the diaphragm 2. As mentioned before, the diaphragm 2 and the strain detecting section 2A jointly constitute the pressure sensor 1A in a narrow sense. The strain detecting section 2A comprises an insulating film 8 formed on the upper surface of the diaphragm 2, four semiconductor strain gauges 9 (only two of which are shown) formed on the insulating film 8, thin film conductors 10 for terminals each associated with the strain gauge 9, wires 11 led out from the thin film conductors 10, and a passivation film 12 to cover the strain gauges 9, the thin film conductors 10 and others for protection. These components are all formed based on the semiconductor manufacture technology, as described later. The insulating film 8 is formed not all over the upper surface of the diaphragm 2, but over the region corresponding to the strain causing area so that a diaphragm surface 2a is exposed in the peripheral portion of the diaphragm 2. This diaphragm surface 2a serves as a bonding surface to be joined to the step surface of the larger-diameter bore 5a by diffusion bonding as mentioned above. The other construction and characteristics of the insulating film 8, the strain gauges 9, the thin film conductors 10, the wires 11 and the passivation film 12 are utterly the same as those of the prior art explained before in connection with FIG. 39, and hence not described here. With such structure of the pressure sensor, when a pressure P such as a hydraulic pressure is applied to the lower surface of the diaphragm 2 as shown in FIG. 1, a hydraulic fluid as a pressure medium produces a strain in the region corresponding to the strain causing area of the diaphragm 2. And the four strain gauges 9 disposed in the optimum positional relationship with respect to the strain causing area detect the strain and generate a voltage between the paired wires 11 and 11 dependent on the strain. It is to be noted that since the strain detecting section 2A thus constructed has a thickness on the order of microns much thinner than that of the diaphragm 2, the structure of the strain detecting section 2A is not shown in FIG. 1.

Figure 4:
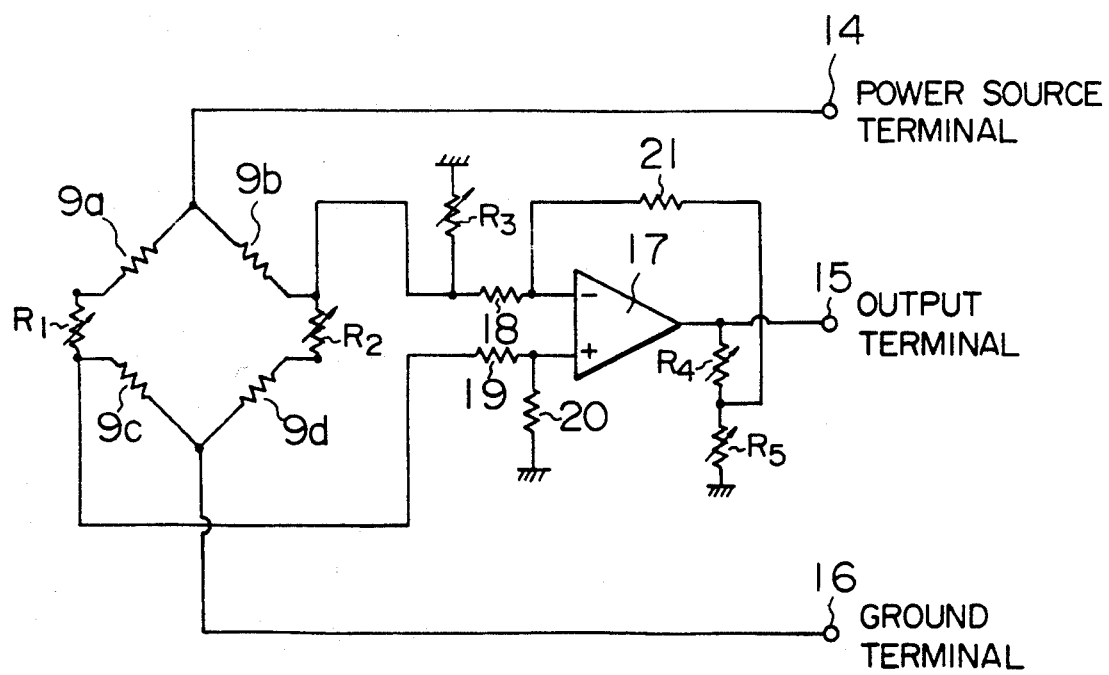
FIG. 4 is a circuit diagram showing the configuration of an electric circuit section in detail.

In FIG. 1, the electric circuit section 4 is disposed on a circuit substrate 13. The circuit substrate 13 is disposed in the larger-diameter bore 5c formed on the upper side of the support member 3, whereby the electric circuit section 4 is in itself substantially placed and installed in the larger-diameter bore 5c. The electric circuit section 4 includes an amplifier circuit section, adjusting resistors and other components. FIG. 4 shows one example of the circuit configuration which comprises the strain gauges 9 and the electric circuit section 4. Referring to FIG. 4, four resistors 9a, 9b, 9c, 9d represent the four strain gauges 9 in the form of electric circuit elements, and are interconnected so as to form a Wheatstone bridge circuit. A power source terminal 14 is connected to a node between the resistors 9a and 9b, while a ground terminal 16 is connected to a node between the resistors 9c and 9d. A variable resistor $R_1$ between the resistors 9a and 9c and a variable resistor $R_2$ between the resistors 9b and 9c are each of a resistor for adjustment of zero point compensation. Output voltages of the Wheatstone bridge circuit are taken out from the respective terminals of the resistors $R_1$ and $R_2$. An operational amplifier 17 is associated with resistors 18-21 and variable resistors $R_3$, $R_4$, $R_5$ to constitute a differential amplifier. The output voltages of the Wheatstone bridge circuit are divided by the associated resistors on the input side, and applied to a non-inverted input terminal and an inverted input terminal of the operational amplifier 17, respectively, so that a voltage corresponding to the differential voltage on the input side is amplified and issued from an output terminal 15 of the operational amplifier 17. Among the variable resistors $R_3$, $R_4$ and $R_5$, $R_3$ is of a resistor for offset adjustment, and $R_4$, $R_5$ are of resistors for gain adjustment. Thus, the electric circuit section 4 includes the amplifier circuit section, the plurality of adjusting resistors, and the three connection terminals; i.e., the source terminal 14, the output terminal 15 and the ground terminal 16. As shown in FIG. 1, wiring leads 14a, 15a, 16a are connected to these connection terminals 14, 15, 16, respectively, and further led out to the exterior. The adjusting resistors are arranged in such a manner as to be easily adjusted from above the electric circuit section 4. The wires 11, 11 led out from the strain detecting section 2A formed on the diaphragm 2 are inserted through the smaller-diameter bore 5b and then connected to the electric circuit section 4 on the circuit substrate 13 after passing through a small bore formed in the circuit substrate 13.

Figure 5:
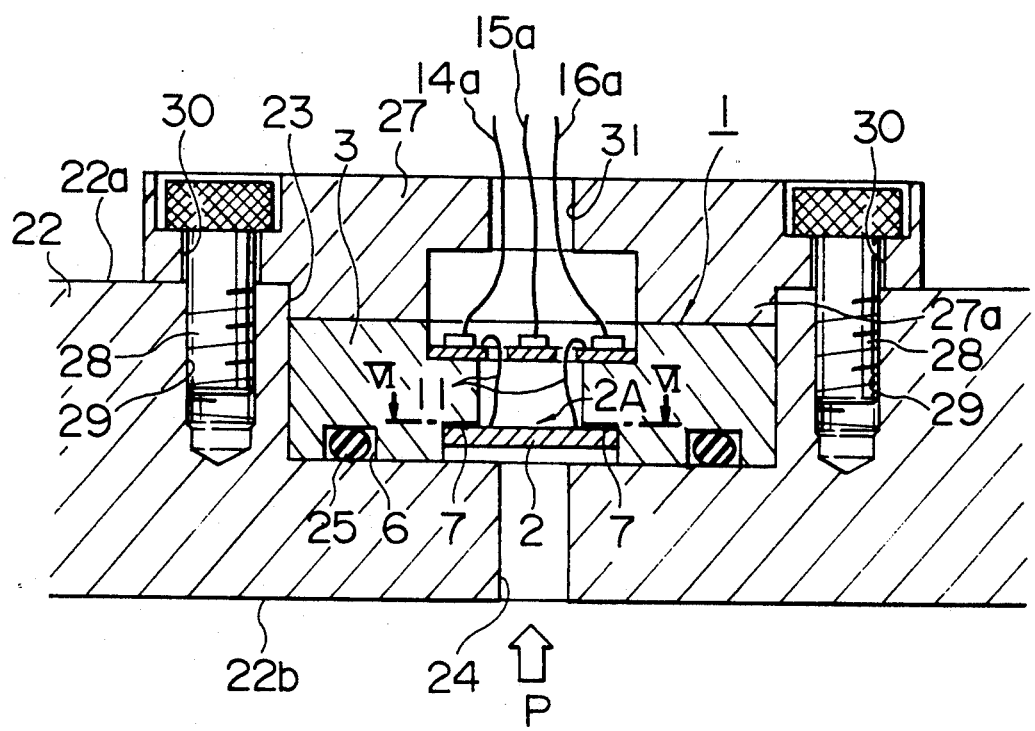
Figure 6:
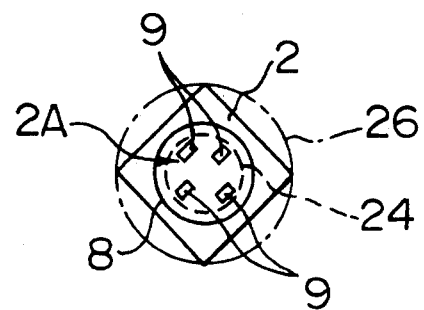
FIG. 6 is a sectional view taken along the line VI—VI in FIG. 5.

FIG. 5 is a vertical sectional view showing a state where the pressure sensor unit 1 having the structure shown in FIG. 1 is mounted onto a wall 22 of an equipment such as a hydraulic pipe. Referring to FIG. 5, designated by reference numeral 22a is an outer surface of the wall 22 and 22b is an inner surface thereof. The wall 22 is in the outer surface 22a with a circular recess 23 in which the support member 3 of the pressure sensor unit 1 is placed and installed, with a bore 24 circular in cross section, for example, bored from the bottom surface of the recess 23 to the inner surface 22b. Accordingly, the side of the recess 23 is communicated with the fluid (oil) passage side via the bore 24. The depth of the recess 23 is greater than the thickness of the support member 3. The support member 3 on which the diaphragm 2, the electric circuit section 4 and others have been mounted in accordance with the structure of the pressure sensor unit shown in FIG. 1 is fitted in the recess 23 of the wall 22 for installation. A seal ring 25 for oil sealing is arranged in the ring-like groove 6 formed in the lower surface of the support member 3. The support member 3 is then disposed in the recess 23 by contacting the lower surface of the support member 3 with the bottom surface of the recess 23, while making the seal ring 25 abutted with the bottom surface of the recess 23. In a state where the pressure sensor unit 1 is mounted onto the wall 22, as shown in FIG. 5, the lower surface, i.e., the pressure receiving surface, of the diaphragm 2 faces the fluid passage via the bore 24 to be subjected to the pressure P. In FIG. 5, since the diaphragm 2 receiving the pressure from below is supported by the stepped portion of the larger-diameter bore 5a of the support member 3 and fixedly joined to the step surface by diffusion bonding, pressure detection can be performed even for a higher pressure. FIG. 6 is a sectional view taken along the line VI—VI in FIG. 5, and shows the arrangement on the upper surface of the diaphragm 2 square in a plan view. Referring to FIG. 6, designated by 26 is an outline of the inner wall surface of the larger-diameter bore 5a, and 24 is the above-mentioned bore formed through the wall 22 in a position below the diaphragm 2. Four small rectangles 9 indicate one example of the arranged configuration of the strain gauges.

Returning to FIG. 5, 27 is a retainer member for pressing and fixing the pressure sensor unit 1 installed in the recess 23 from the side of the outer surface 22a. The retainer member 27 is a circular plate-like member having a projection 27a to be fitted in the recess 23. The retainer member 27 is fixed to the wall 22 by at least two bolts 28 while making the projection 27a pressed against the support member 3. 29 is a threaded hole formed in the wall and 30 is a bolt insertion hole formed through the retainer member 27. The bolt insertion hole 30 includes a larger-diameter portion which receives a bolt head such that the head of a bolt 28 will not protrude from the hole 30 when it is screwed therein. Further, a stepped bore 31 is formed at the center of the retainer member 27, and the wiring leads 14a, 15a, 16a led out from the electric circuit section 4 of the pressure sensor unit 1 are taken out to the exterior through the bore 31. With the retaining structure effected by use of the retainer member 27, the pressing force produced by the retainer member 27 is directly applied to the support member 3 of high strength and the diaphragm 2 is hence subjected to no adverse deforming forces, whereby pressure measuring accuracy can be maintained high.

Next, a manufacture method for a structural subassembly comprising the diaphragm 2, the support member 3, the insulating film 8 and the strain gauges 9 will be described in detail in relation to the pressure sensor unit 1 shown in FIG. 1.

On the upper surface of the metal-made diaphragm 2 fabricated into a thin plate shape as mentioned above, the insulating film 8 is formed as a thin film having a thickness of about 1-20 $\mu$m by application of the film forming technique such as CVD, vacuum vapor deposition or sputtering, using $SiO_2$, SiC, $SiN_x$ or the like, for example, as with the prior art. In this case, the insulating film 8 is formed on the region corresponding to the strain causing area of the diaphragm 2 which has been known to a maker or manufacturer, so that the peripheral portion of the diaphragm 2 remains free of the insulating film 8 for later use as the bonding surface 2a. The semiconductor strain gauges 9 are formed on the upper surface of the insulating film 8 as follows. First, a silicon thin film in an amorphous state is formed on the upper surface of the insulating film 8 by plasma CVD, for example, while doping an impurity such as phosphor or boron. Then, the photolithography is applied to the silicon thin film to form patterns of the amorphous strain gauges. Afterward, heat treatment is applied so as to provide crystalline strain gauges. It is to be noted that although the strain gauges in an amorphous state cannot function as strain gauges, the term "strain gauge(s)" is used regardless of an amorphous or crystalline state in this description and the attached claims for convenience of explanation and unification of terms. In the foregoing manufacture method, the patterning step and the heat treating step may be reversed in the process sequence.

In the pressure sensor unit 1 of the foregoing embodiment, heat treatment for diffusion bonding between the diaphragm 2 and the support member 3, and heat treatment for converting the strain gauges 9 on the upper surface of the diaphragm 2 from an amorphous state to a crystalline state can concurrently be performed by single heat treatment. The diffusion bonding is a technique to effect atomic bonding between the diaphragm 2 and the support member 3 both made of the same metallic material, for example, by abutting the bonding surface 2a of the diaphragm 2 against the step surface of the larger-diameter bore 5a of the support member 3 with an insert of aluminum or the like interposed therebetween, and then heating the assembly for a certain period of time at a temperature not lower than 550° C., while being held in a pressurized state under the atmosphere of vacuum or argon. This technique can provide a very high bond force. The diffusion bonding can also be made in the case where the diaphragm 2 and the support member 3 are formed not of the same material, but of different or inhomogeneous materials. Meanwhile, the strain gauges 9 in an amorphous state is crystallized at a temperature of 500°-650° C. Accordingly, the strain gauges 9 can concurrently be crystallized and bonded in a single step by utilizing the heat treatment of the diffusion bonding for crystallization as well.

As described above, the diaphragm 2 is formed in advance in conformity with the bonding surface of the recess (larger-diameter bore) 5a in a state where the diaphragm 2 is placed and installed in the recess 5a of the support member 3 (diaphragm forming step); the insulating film 8 is formed on the upper surface of this diaphragm 2 at a predetermined location (insulating film forming step); an amorphous silicon thin film is formed on the upper surface of the insulating film 8 (silicon thin film forming step); and then amorphous strain gauges 9 are formed in patterns on this silicon thin film (gauge pattern forming step). Afterward, in order that the diaphragm 2 having the patterns of the amorphous strain gauges 9 formed thereon is fixedly joined to the support member 3 by diffusion bonding and the amorphous strain gauges 9 are crystallized, the support member 3, the diaphragm 2 and the amorphous strain gauge 9 are heat treated together (heat treating step), thereby fabricating the aforesaid structural subassembly of the pressure sensor unit 1.

It is to be noted that the foregoing manner of heat treatment for crystallizing the amorphous silicon thin film has been proposed by the present inventors in Japanese Patent Application No. 63(1988)-241995. As detailed in the specification of this patent application, by heating an amorphous silicon film with a resistance value nearly close to that of an insulator, a crystalline silicon thin film having the reduced resistance value and providing a piezo-resistance effect can be formed by the heat as treatment mentioned above.

Next, another embodiment of the manufacture method for the aforesaid structural subassembly of the pressure sensor unit 1 will be described with reference to FIGS. 7 through 16. This manufacture method is directed to produce the structural subassembly comprising the diaphragm 2, the insulating film 8 and the strain gauge 9.

Figure 7:
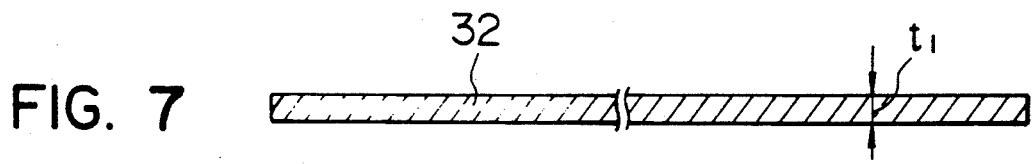
FIGS. 7 through 16 are process views showing one embodiment of a manufacture method for the pressure sensor according to the present invention.
Figure 8:
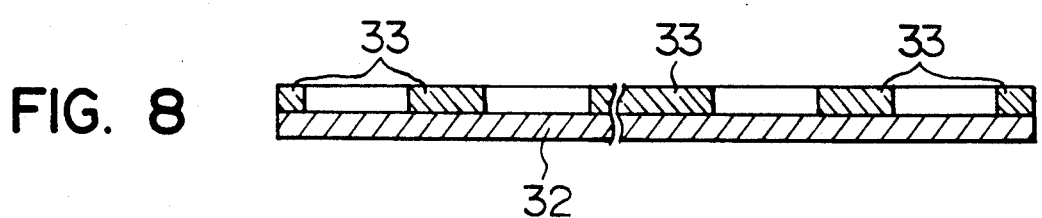

First, a metal-made thin plate substrate 32 shown in FIG. 7 is fabricated in a substrate fabricating step. This metal-made thin plate substrate 32 becomes the diaphragm 2 later. The thin plate substrate 32 is formed into a thin plate shape with a thickness $t_1$ of about 0.05–2 mm using a metal material such as SUS630, for example. As described later, the substrate 32 has such a planar dimension as enough to fabricate a multiplicity of diaphragms 2 at the same time. A metallic mask 33 is then fixedly placed on the upper surface of the thin plate substrate 32 as shown in a mask placing step of FIG. 8. Placing the metallic mask 33 defines a multiplicity of circular spaces on the upper surface of the thin plate substrate 32, each circular space corresponding to a region where the strain detecting section 2A is formed.

Figure 9:
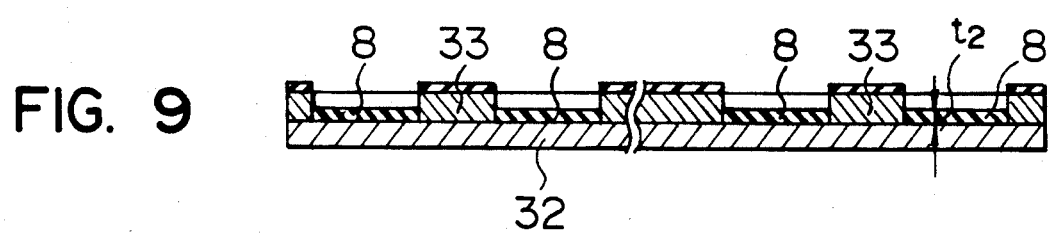

FIG. 9 shows an insulating film forming step. In this step, the insulating film 8 having a thickness $t_2$ of about 1–20 μm is formed in each of circular spaces defined by the metallic mask 33 on the upper surface of the thin plate substrate 32 by an appropriate film forming technique such as vacuum vapor deposition or sputtering, using $SiO_2$, $SiC$, $SiN_x$ or the like.

Figure 10:
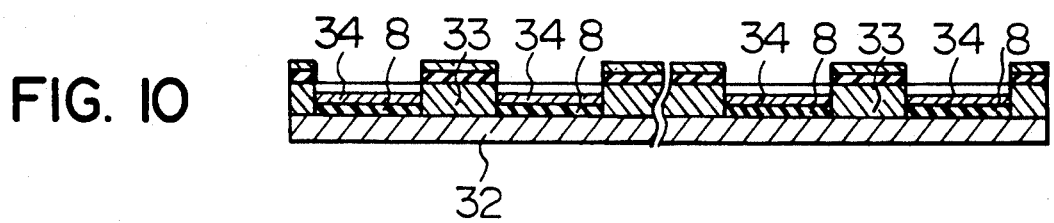
Figure 11:
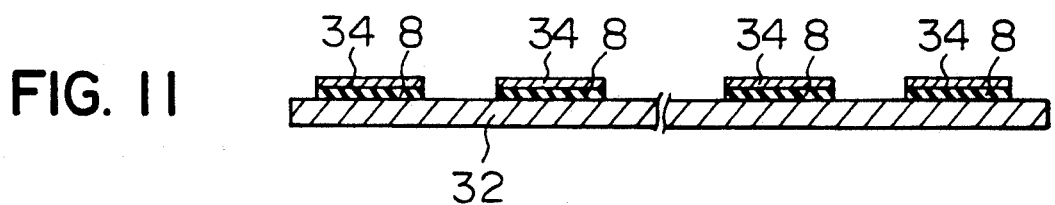
Figure 12:
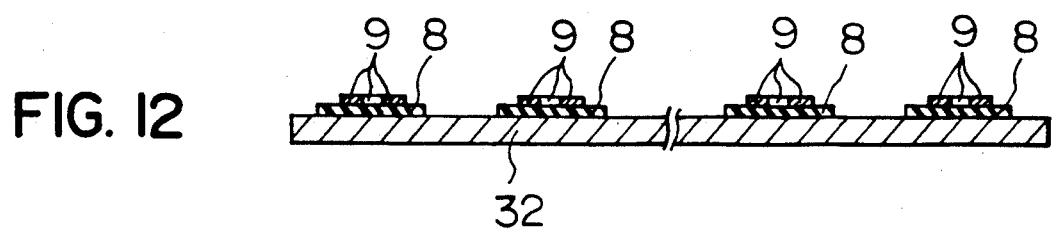

FIG. 10 shows a silicon thin film forming step. In this step, a silicon thin film 34 in an amorphous state of low crystallinity is formed on each upper surface of the multiple insulating films 8 by doping phosphor or boron with plasma CVD, for example. After forming the silicon thin films, the metallic mask 33 is removed as shown in a mask removing step of FIG. 11. Then, a gauge pattern forming step is carried out to form or pattern the four amorphous strain gauges 9 on each silicon thin film 34 by photolithography as shown in FIGS. 12 and 13.

Figure 13:
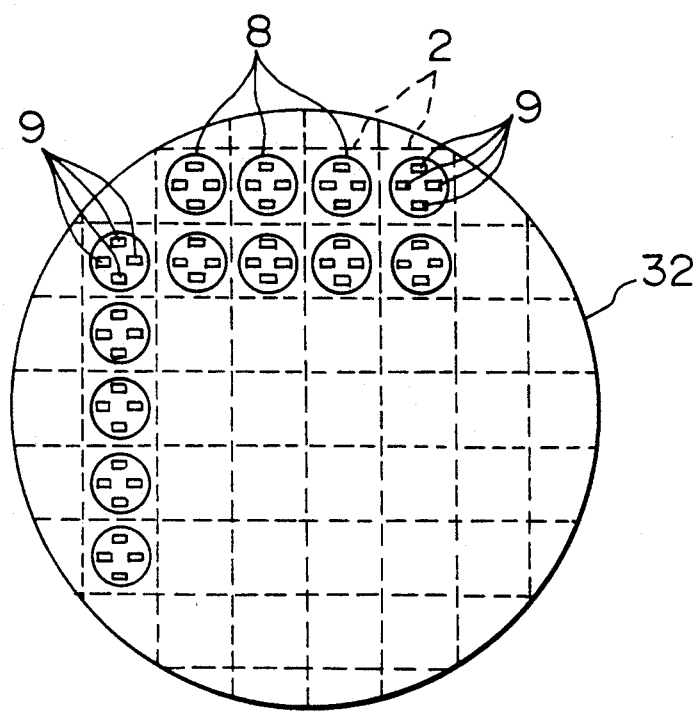
Figure 14:
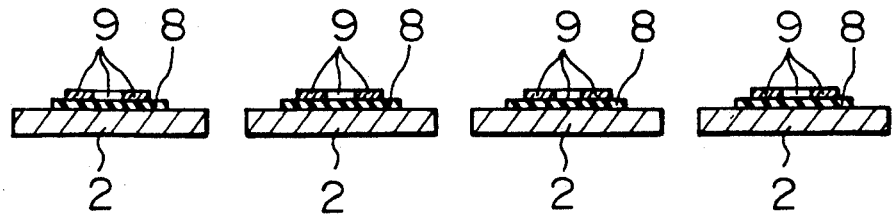

FIGS. 13 and 14 show a severing step. In this step, the thin plate substrate 32 is severed as indicated by broken lines in FIG. 13 into pieces for every four amorphous strain gauges 9 formed in the gauge pattern forming step, thereby fabricating the multiplicity of pressure sensors 1A each of which includes the diaphragm 2, the insulating film 8 and the four amorphous strain gauges 9.

Figure 15:
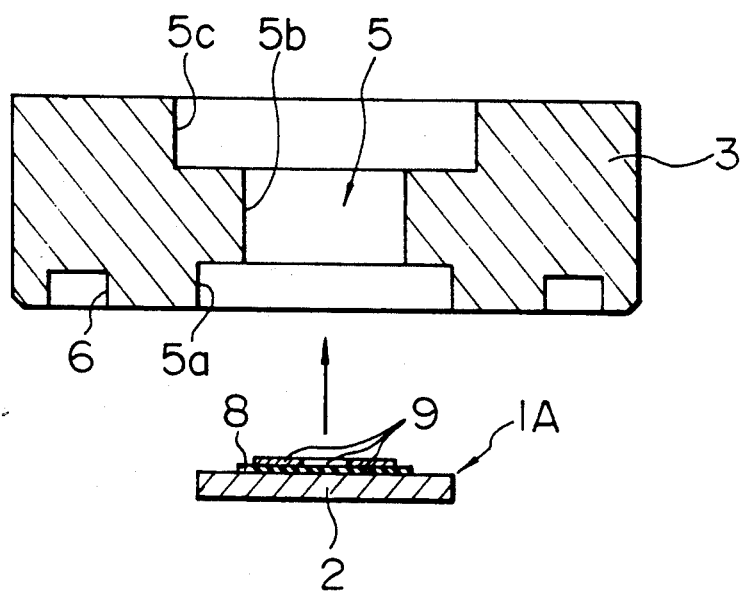
Figure 16:
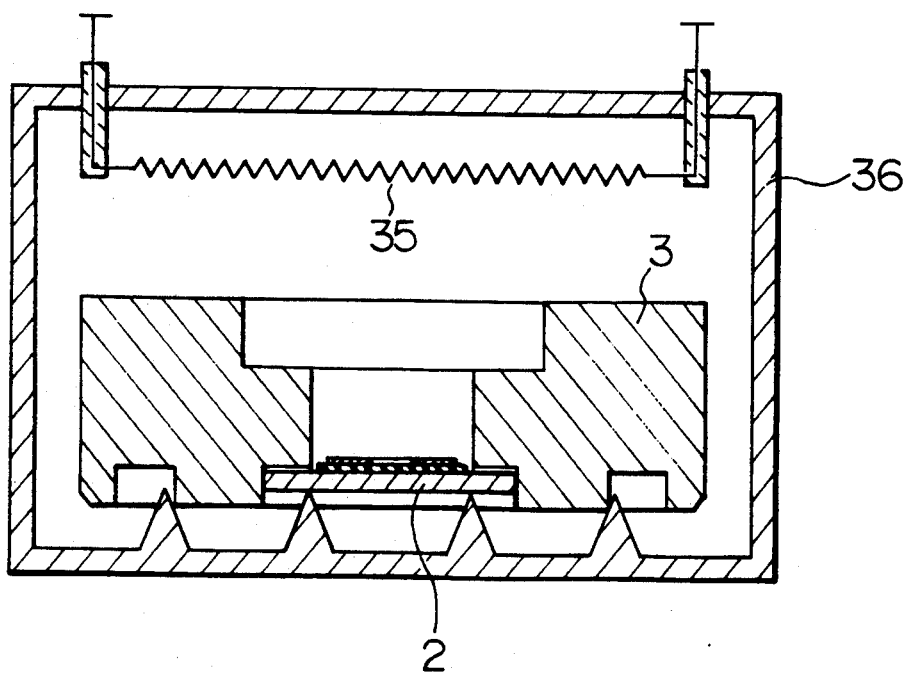

Then, FIGS. 15 and 16 show a heat treating step for diffusion bonding the support member 3 and the diaphragm 2 and crystallizing the amorphous strain gauges 9. To prepare for the diffusion bonding, as shown in FIG. 15, an insert material such as aluminum is first disposed or coated on either the step bonding surface of the large-diameter bore 5a of the support member 3 and the bonding surface 2a of the diaphragm 2, followed by closely contacting the support member 3 and the diaphragm 2 inclusive of the strain detecting section with each other. At this time, the diaphragm 2 is placed and installed into the larger-diameter bore 5a of the support member 3 while being guided by the inner wall surface of the larger-diameter bore 5a for positioning. In a state where the diaphragm 2 is installed in the larger-diameter bore 5a, the strain detecting section faces the smaller-diameter bore 5b in the optimum positional relationship. While keeping the support member 3 and the diaphragm 2 in a closely contacted state, they are put in an electric furnace 36 equipped with a heater 35 and then heated for a certain period of time at a temperature not lower than 550° C. necessary for the diffusion bonding. This allows the support member 3 and the diaphragm 2 to be fixedly joined by atomic bonding, and the amorphous strain gauges 9 to be crystallized for conversion to the semiconductor strain gauges which have a piezo-resistance effect. Thus, the diffusion bonding between the support member 3 and the diaphragm 2 and the crystallization of the semiconductor strain gauges 9 can be performed by single heat treatment, which leads to a reduction in both the number of manufacture steps and the production cost. It is also possible to fabricate a multiplicity of strain detecting sections at the same time using a thin plate substrate of large area, and hence to manufacture pressure sensors with the same quality in a mass quantity.

Figure 17:
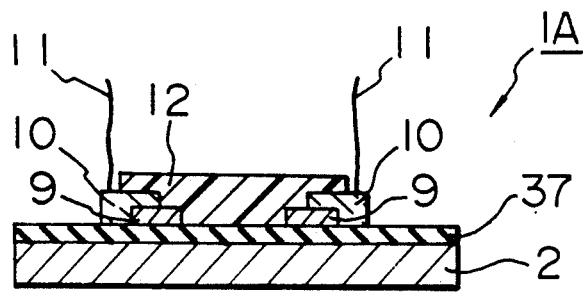
FIG. 17 is a vertical sectional view showing another embodiment of the pressure sensor according to the present invention.
Figure 18:
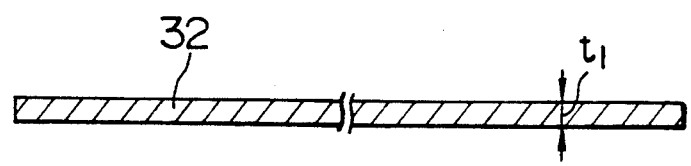
FIGS. 18 through 23 are process views showing a manufacture method for the pressure sensor shown in FIG. 17.

FIG. 17 shows a modified embodiment of the structure of the pressure sensor 1A which comprises the diaphragm 2 and the strain detecting section 2A comprised of an insulating film 37, the semiconductor strain gauges 9, the thin film conductors 10 and the passivation film 12. In this embodiment, the insulating film is formed all over the upper surface of the diaphragm 2. The remaining construction is identical to that shown in FIG. 3. The pressure sensor thus constructed is fixed to the stepped portion of the circular large-diameter bore 5a of the support member 3 using an adhesive. This type pressure sensor is adopted in the case where the pressure to be detected is relatively low, because the bond force between the support member 3 and the diaphragm 2 is weaker than in the case where they are fixedly joined by diffusion bonding.

Figure 19:
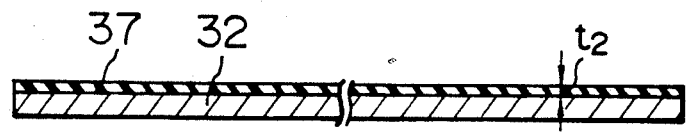
Figure 20:
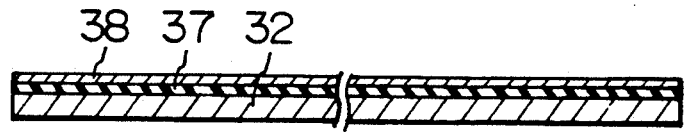
Figure 21:
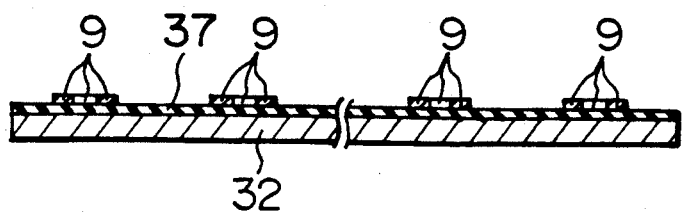
Figure 22:
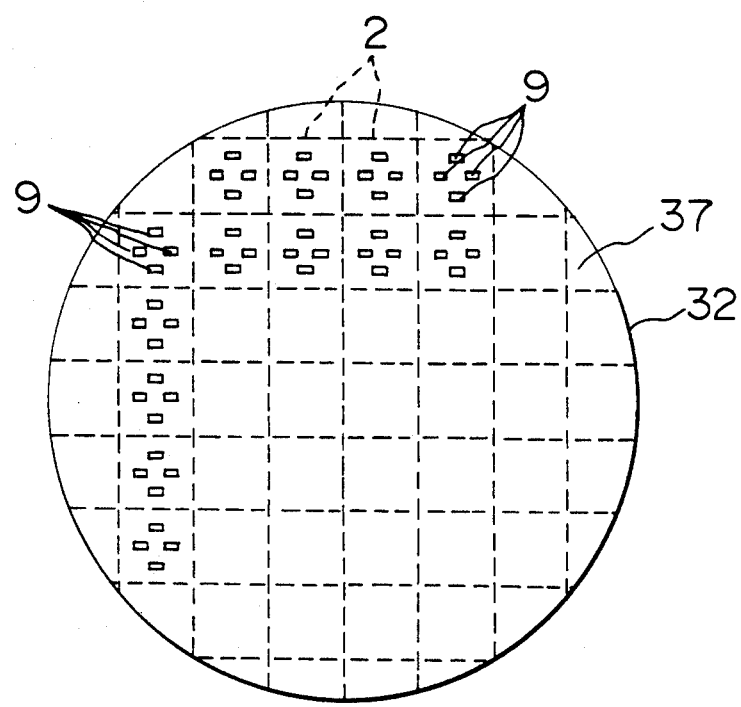
Figure 23:
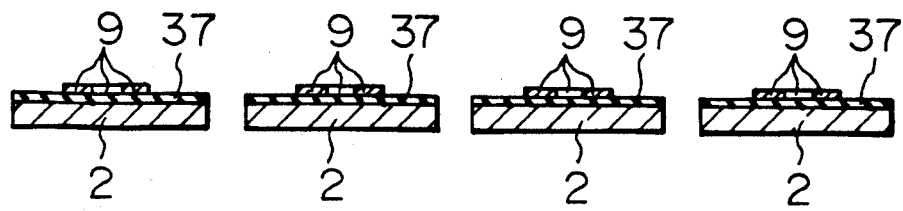

A manufacture method for the pressure sensor having that structure will be described with reference to FIGS. 18 through 23. This manufacture method is basically the same as that explained above in connection with FIGS. 7 through 14. First, the circular metal-made thin plate substrate 32 is fabricated in a substrate fabricating step (FIG. 18), and the insulating film 37 is formed all over the upper surface of the thin plate substrate 32 by the film forming technique in an insulating film forming step (FIG. 19). Then, an amorphous silicon thin film 38 is formed all over the upper surface of the insulating film 37 in a silicon thin film forming step (FIG. 20). Afterward, a gauge pattern forming step is carried out to form the silicon thin film 38 into patterns of the multiple amorphous strain gauges 9 by photolithography (FIGS. 21 and 22). Each set of the gauge patterns is formed in a predetermined region which turns out to be the strain causing area of the diaphragm 2 later. In a severing step, the thin plate substrate 32 and the insulating film 37 are severed as indicated by broken lines in FIG. 22 into pieces for every four amorphous strain gauges 9, thereby finally fabricating the multiplicity of pressure sensors 1A each of which includes the diaphragm 2, the insulating film 37 and the amorphous strain gauges 9 (FIG. 23). Afterward, the thus-fabricated pressure sensors 1A shown in FIG. 23 are subjected to the above-mentioned heat treatment for crystallizing the amorphous strain gauges 9. An adhesive is then applied to the upper surface of the insulating film 37 at a predetermined location for fixing each of pressure sensors 1A to the support member 3. With the structure of the pressure sensor according to this embodiment, the manufacture process is simplified owing to no need of using a metallic mask. Also, the bonding method is easier because the support member 3 and the diaphragm 2 are bonded to each other using an adhesive.

Other modified embodiments of the pressure sensor unit 1 will be described with reference to FIGS. 24 through 26.

Figure 24:
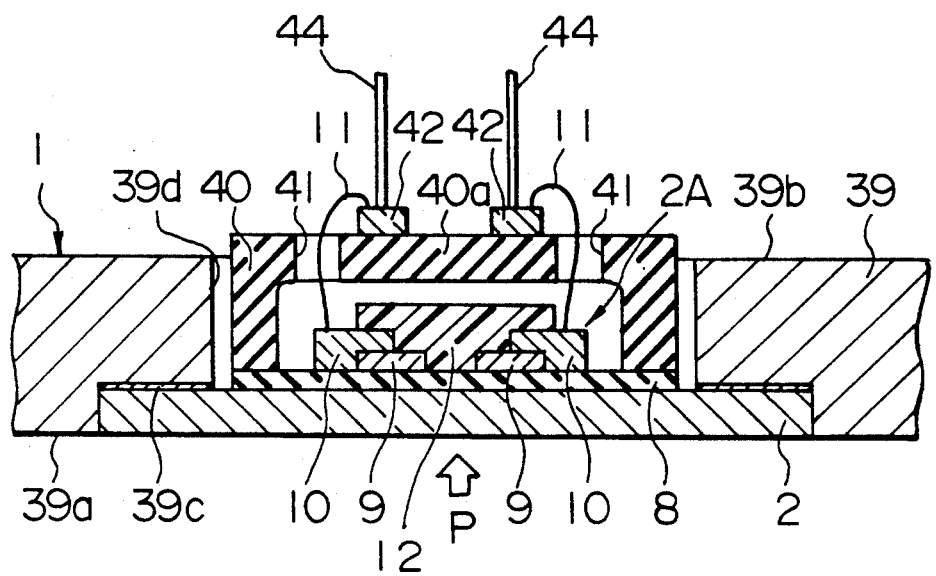
FIG. 24 is a vertical sectional view showing another embodiment of the pressure sensor unit according to the present invention.

FIG. 24 shows a part of the pressure sensor unit 1. The pressure sensor unit 1 comprises a flat plate base 39 which has a lower surface 39a as a fluid contact surface brought into contact with the hydraulic fluid, as viewed on the drawing, and which is formed with a larger-diameter stepped portion 39c and a smaller-diameter bore portion 39d formed concentrically ranging from the fluid contact surface 39a to the opposite surface 39b, and a diaphragm 2 which is circular, for example, and fitted in the larger-diameter stepped portion 39c of the base 39. The base 39 may be of, for example, a wall of types of hydraulic equipment such as hydraulic pipes, couplings, hydraulic pumps and hydraulic motors, the wall being brought into contact with the hydraulic fluid. After a strain detecting section 2A has been formed on the upper surface of the diaphragm 2, as viewed on the drawing, the diaphragm 2 is fixed to the larger-diameter stepped portion 39c of the base 39 by diffusion bonding or an adhesive, for example, such that the strain detecting section 2A is received in the smaller-diameter bore portion 39d of the base 39. Thus, in this embodiment, the base 39 serving as a support member is substituted by a wall of hydraulic equipment contacting the hydraulic fluid.

Further, in this embodiment, while the structure of the strain detecting section 2A comprising an insulating film 8, semiconductor strain gauges 9, thin film conductors 10, a passivation film 12 and wires 11 is the same as that of the embodiment shown in FIG. 3, the surrounding structure is different from that of the foregoing embodiment. More specifically, designated by 40 is a cover made of synthetic resin and formed into a tubular shape equipped with a lid. The cover 40 is fixed to the insulating film 8 so as to cover the strain detecting section 2A, and has a plurality of wire insertion bores 41, 41 (two shown in the illustrated embodiment) formed through a top wall 40a thereof. 42, 42 are connection terminal fixed to the upper surface of the top wall 40a for respective connections with a plurality of lead wires 44, 44. Connected to each of the plural connection terminals 42 is one end of the corresponding wire 11. An electric circuit section, a measuring unit and others (not shown) are connected to the distal ends of the lead wires 44, 44.

With the pressure sensor unit 1 having the above construction, it is possible to enhance the strength of the diaphragm as an important part of the pressure sensor 1A, and to precisely and easily position the strain detecting section 2A formed on the diaphragm 2 simply by fitting the diaphragm 2 in the larger-diameter stepped portion 39c of the base 39 to be placed and installed therein, like the foregoing embodiment. In addition, since the base 39 as a support member is directly constituted by a wall of hydraulic equipment, the pressure sensor unit 1 can be mounted in compact fashion.

Figure 25:
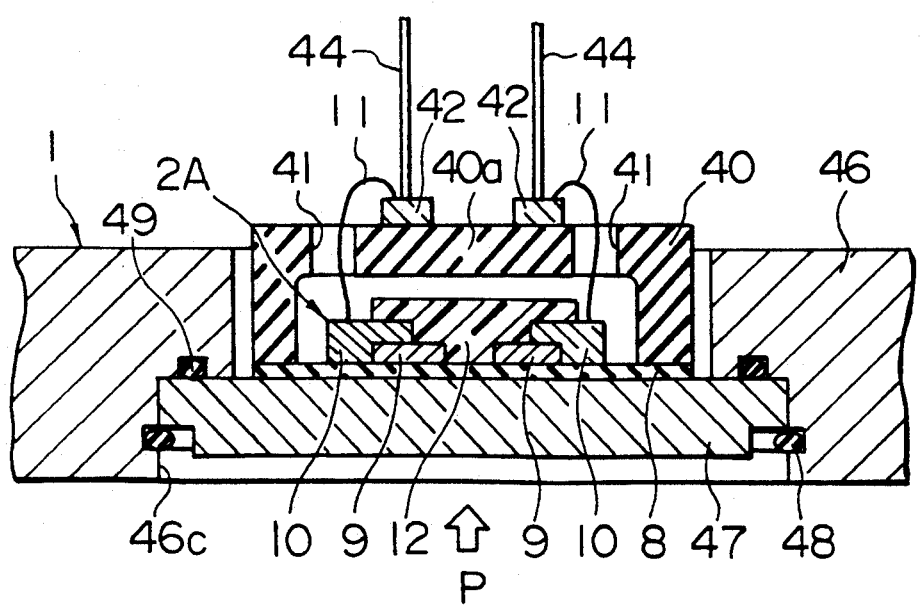
FIG. 25 is a vertical sectional view showing still another embodiment of the pressure sensor unit according to the present invention.

FIG. 25 is a view similar to FIG. 24, showing still another embodiment. In this embodiment, a snap ring 48 is interposed between the inner peripheral surface of the larger-diameter stepped portion 46c of the base 46 and the outer peripheral surface of a diaphragm 47 fabricated into a circular shape. Also, an O-seal ring 49 for oil sealing is disposed at the contact surface between the diaphragm 47 and the base 46 to prevent the hydraulic fluid, etc. from entering the side of the strain detecting section 2A. The remaining construction is the same as that of the embodiment explained above by referring to FIG. 24. With this embodiment, in addition to the effect of improving the positioning accuracy as described in connection with the foregoing embodiments, the work of mounting the diaphragm 47 onto the base 46 can be facilitated and the diaphragm 47 can be removed for replacement of the strain detection section 2A, resulting in excellent operability for assembly, maintenance and other works.

Figure 26:
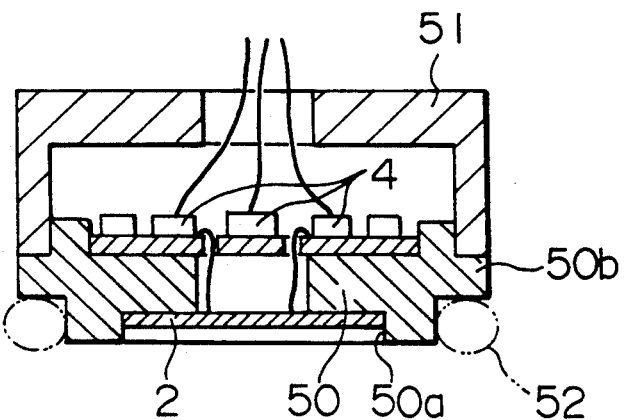
FIG. 26 is a vertical sectional view showing yet another embodiment of the pressure sensor unit according to the present invention.

FIG. 26 shows a pressure sensor unit 1 fabricated into the more compact structure. Referring to FIG. 26, designated at 50 is a small-sized support member, 2 is a diaphragm placed and installed in a larger-diameter bore 50a of the support member 50 and fixedly joined to the support member 50 by diffusion bonding or other means, and 4 is an electric circuit section disposed on the upper surface of the support member 50. In this pressure sensor unit 1, a projected rim or flange 50b is formed all over the peripheral side face of the support member 50, By utilizing the projected rim 50b, a cover member 51 doubling as a cover and a retainer member is held on the support member 50 by fitting or other means, while a seal ring 52 is disposed in a space under the projected rim 50b as indicated by imaginary lines. The pressure sensor unit 1 according to this embodiment can facilitate storage and handling, prevent damage of the electric circuit section, and can be attached to hydraulic equipment by easy mounting work.

Figure 27:
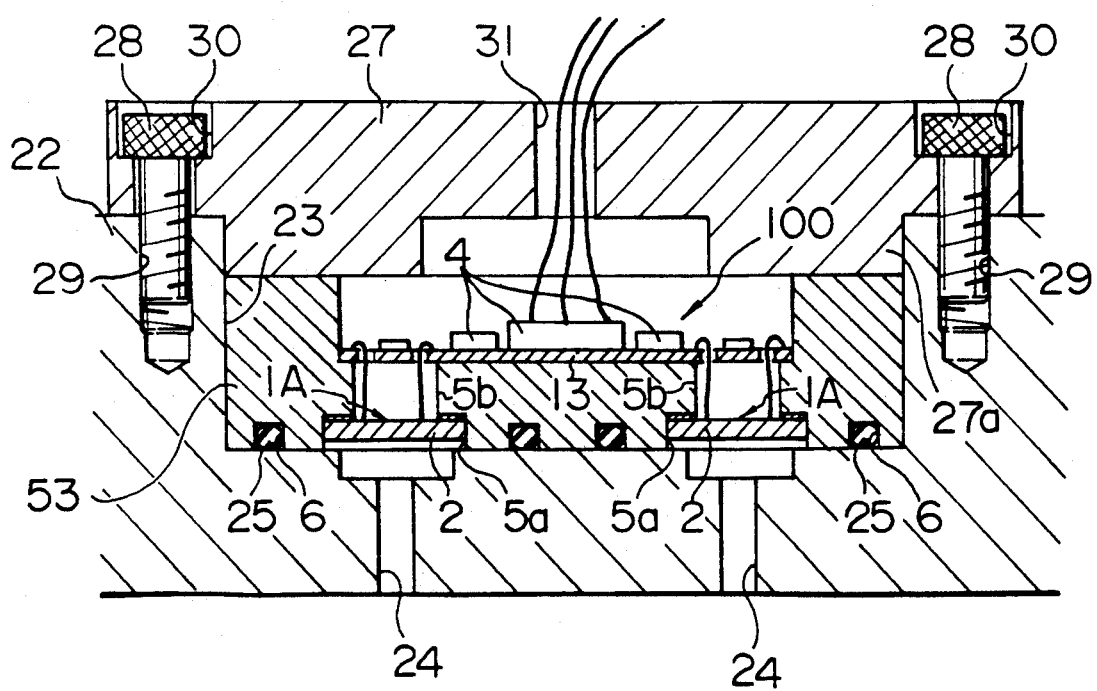

FIG. 27 is a view similar to FIG. 5, but showing a pressure sensor unit 100 basically different in the construction. The pressure sensor unit 100 of this embodiment is constructed such that it includes two pressure sensors 1A, and the output difference between the two pressure sensors 1A is taken to produce an intended pressure signal. In other words, the pressure sensor unit 100 is constituted as a differential pressure sensor. In FIG. 27, the same elements as those shown in FIG. 5 are designated by the same reference numerals. Specifically, 22 is a wall, 23 is a larger-diameter circular recess for receiving the pressure sensor unit 100, 27 is a retainer member for fixing the pressure sensor unit 100 in the recess 23 of the wall 22, and 28 is a bolt for fixing the retainer member 27 to the outer surface of the wall 22. 53 is a support member for the pressure sensor unit 100 according to this embodiment. The support member 53 has a larger diameter than that of the support member 3 in the foregoing embodiment, and is structured so as to include the two pressure sensors 1A. Accordingly, the above-mentioned larger-diameter bore 5a for receiving and fixing a diaphragm 2 of each pressure sensor 1A is formed two in number in the lower surface of the support member 53, as viewed on the drawing. The surrounding structures of the two pressure sensors 1A are identical to each other, and designed as shown in FIG. 5. Therefore, the support member 53 is provided with two smaller-diameter bores 5b, two ring-like grooves 6, and two seal rings 25. Thus, the pressure sensor unit 100 is constructed to provide the function of detecting a pressure at two locations. Meanwhile, corresponding to such structure of the pressure sensor unit 100, the wall 22 is formed with two bores 24 for introducing a pressure such as a hydraulic pressure therethrough. Pressure levels introduced to the bores 24, 24 are different from each other. The surrounding structure of a mount location for the electric circuit section 4, disposed in an upper portion of the support member 53, is substantially the same as that of the support member 3 in the foregoing embodiment, just except that the size is increased to some extent. However, the electric circuit section 4 is arranged so as to receive detection signals from the two pressure sensors 1A corresponding to the different levels of pressure, and output a signal dependent on the differential pressure.

Figure 28:
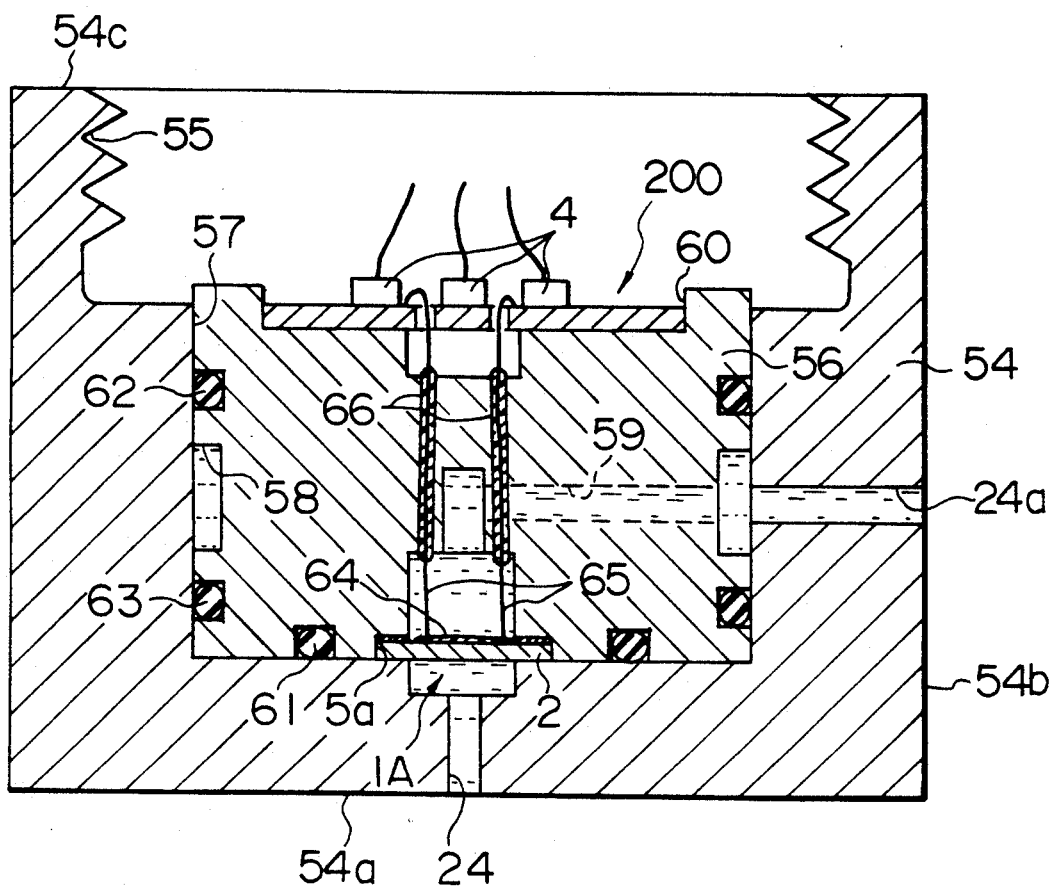
FIG. 28 is a view similar to FIG. 27, showing another embodiment of the pressure sensor unit according to the present invention constituted as a differential pressure sensor.

FIG. 28 shows a modified embodiment of the differential pressure sensor which is constructed in accordance with the present invention. With the structure of a pressure sensor unit 200 constituted into a differential pressure sensor, a single pressure sensor 1A is employed to achieve the differential pressure sensor. In FIG. 28, designated by 54 is a part of a wall of hydraulic equipment or the like, the wall 54 having inner wall surfaces 54a and 54b subjected to different levels of hydraulic pressure. The inner wall surfaces 54a, 54b of the wall 54 are formed with bores 24, 24a through which the hydraulic fluid is introduced, respectively. A larger-diameter bore 55 formed with female threads on its inner surface is bored in an outer wall surface 54c of the wall 54, and this bore 55 is formed in its bottom with a smaller-diameter bore 57 in which a support member 56 for holding the pressure sensor 1A is to be placed and installed. The support member 56 has a substantially columnar shape, and is formed with a larger-diameter bore 5a in its lower portion for receiving and fixing a diaphragm 2 of the pressure sensor 1A, a groove 58 in the peripheral side face for defining a fluid passage, and a bore 59 for a fluid passage in communication with the upper surface side of the diaphragm 2 and the groove 58, as viewed on the drawing. The aforesaid bore 24 is communicated with the lower surface side of the diaphragm 2, and the bore 24a has an opening its left end positioned to face the groove 58, as viewed on the drawing. Accordingly, the hydraulic fluid contacting the inner wall surface 54a is introduced to the lower surface side of the diaphragm 2 via the bore 24, while the hydraulic fluid contacting the inner wall surface 54b is introduced to the upper surface side of the diaphragm 2 via the bore 24a, the groove 58 and the bore 59. Further, an electric circuit section 4 is placed and installed in a recess 60 formed in the upper surface of the support member 56. Designated by 61, 62, 63 are seal rings. Specifically, 61 is an O-seal ring disposed in a ring-like groove formed in the lower surface of the support member 56, and 62, 63 are seal rings disposed in circumferential grooves formed in the peripheral side face of the support member.

The structure of the pressure sensor 1A is basically identical to that explained before in connection with the foregoing embodiments. However, since the hydraulic fluid is also introduced to the upper surface side of the diaphragm 2, a protective film 64 formed of SiNx or a molding film is provided to protect the strain detecting section formed on the upper surface of the diaphragm 2. With this embodiment thus constructed, the structure allowing different levels of pressure to exert on the upper and lower surfaces of the diaphragm 2 of the pressure sensor 1A makes it possible to directly detect the differential pressure therebetween. In other words, a differential pressure sensor excellent in response can be achieved by the single pressure sensor 1A by making the opposite surfaces of the metal-made diaphragm 2 subjected to pressures. A differential pressure signal detected by the strain detecting section on the upper surface of the diaphragm 2 is led by a plurality of wiring leads 65 to the electric circuit section 4 through a hermetic seal 66, and then processed by an amplifier and others in the electric circuit section 4. The hermetic seal 66 serves to prevent the hydraulic fluid from entering the side of the electric circuit section 4.

Figure 29:
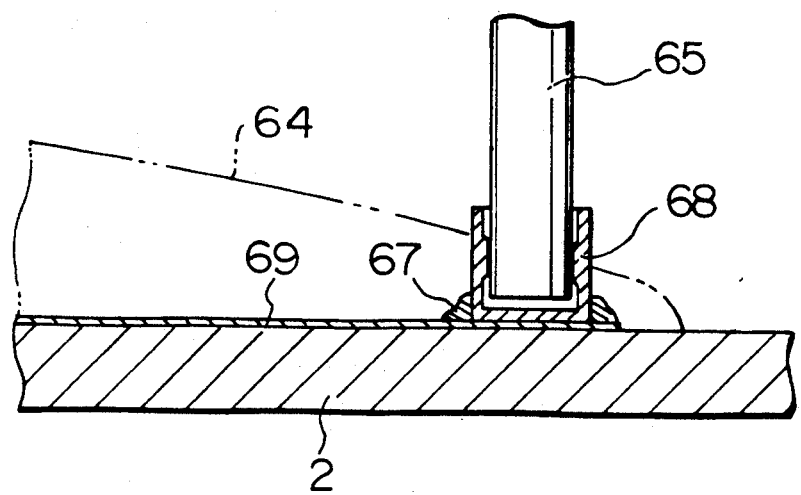
FIG. 29 is an enlarged view of a part of FIG. 28.

FIG. 29 shows one example of the structure for fixing each wiring lead 65 to the upper surface of the diaphragm 2. The wiring lead 65 has its lower end fixed to the upper peripheral surface of the diaphragm 2, and its lower portion coated by the protective film 64. The wiring lead 65 is connected with the pin erecting structure, for example, such that a female pin receiver 68 is provided on the upper peripheral surface of the diaphragm 2 by soldering at 67, and the lower end of the wiring lead 65 is inserted into an opening of the female pin receiver 68 being exposed to the outside from the protective film 64. Accordingly, assembly is much simplified. Alternatively, the wiring lead 65 may simply be soldered. Note that 69 in FIG. 29 designates a thin film for the wiring.

With the structure shown in FIG. 28, the following advantageous effect is provided in addition to that of the present invention explained before in connection with the foregoing embodiments. Since the metal-made diaphragm 2 of the pressure sensor 1A is tightly held between the housing portion of the wall 54 for the support member 56 and the stepped portion of the larger-diameter bore 5a of the support member 56, the support structure becomes very rigid and strong, making it possible to arbitrarily select a higher or lower pressure of the hydraulic fluid in application. Also, since this embodiment can constitute the differential pressure sensor by a single diaphragm, the number of parts is reduced to enable manufacture of the differential pressure sensor unit with the smaller size and the simplified structure. Note that on the upper side of the support member 56, a retainer member (not shown) is disposed to be meshed with the female threads of the bore 55 and fixed therein for holding the support member 56.

Figure 30:
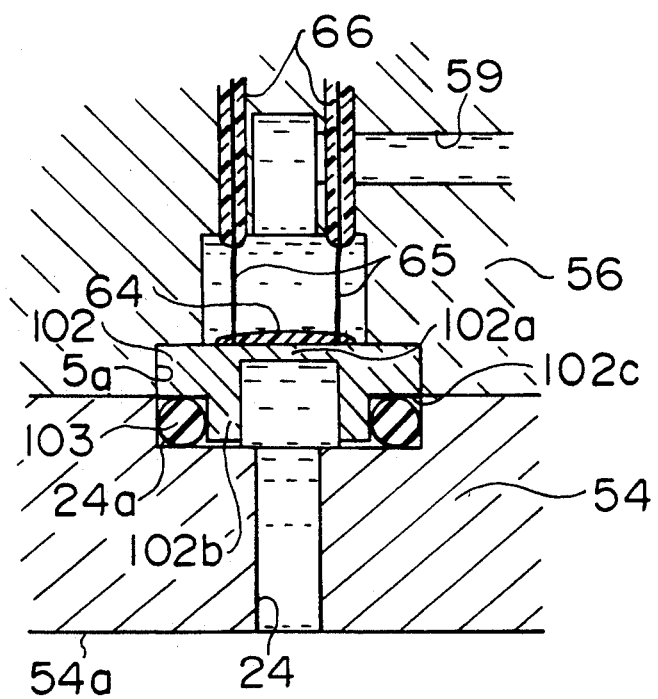
FIG. 30 is a partial vertical sectional view showing a modified embodiment of the differential pressure sensor shown in FIG. 28.

FIG. 30 shows an embodiment obtained by partially modifying the structure of the differential pressure sensor shown in FIG. 28. In this embodiment, the diaphragm subjected to pressures is modified in its shape. In FIG. 30, the same elements as those shown in FIG. 28 are designated by the same reference numerals. Specifically, in FIG. 30, designated by 54 is a wall, 54a is an inner wall surface, 24 is a bore for introducing the hydraulic fluid, 56 is a support member, 59 is a bore for a fluid passage, 65 is a wiring lead, and 66 is a hermetic seal. The peripheral portion not shown in FIG. 30 is constructed similarly to that shown in FIG. 28 except that the seal ring 61 is not used in the former as describer later. Referring to FIG. 30, 102 is a diaphragm according to this embodiment. The diaphragm 102 is of a metal-made diaphragm fabricated by machining. The diaphragm 102 has a strain causing portion 102a in its top plate part, and a strain detection section provided on the strain causing portion 102a while being protected by a protective film 64, the upper and lower surfaces of the strain causing portion 102a being employed as pressure receiving surfaces. The part of the diaphragm 102 extending downward from the periphery of the strain causing portion 102a is formed into a tubular portion 102b continuous to and integral with the strain causing portion 102a. The tubular portion 102b supports the strain causing portion 102a. The upper surface of the tubular portion 102b is constituted as a strain not-causing area, and the wiring leads 65 are connected to the strain not-causing area. A stepped portion 102c is formed in the lower and outer peripheral surface of the tubular portion 102b, as viewed on the drawing. The diaphragm 102 having such configuration is fitted in a larger-diameter bore 5a of the support member 56 to be placed and installed therein for fixing to the step surface by diffusion bonding or an adhesive. In assembly, as shown in FIG. 30, the diaphragm 102 is set such that the fore ends of the tubular portion 102b are located in a larger-diameter bore 24a of the bore 24 of the wall 54, and an annular space is defined by the aforesaid stepped portion 102c and the stepped portion given by the larger-diameter bore 24a. An O-ring-seal 103 is disposed in the annular space. With such assembled structure, the bore 24 for introducing the hydraulic fluid is communicated with an inner side space of the diaphragm, and the hydraulic fluid is applied to the lower surface of the strain causing portion 102a. On the other hand, the hydraulic fluid at a different pressure is introduced via the fluid passage 59 to a space defined above the strain causing portion 102a and applied to the upper surface of the strain causing portion 102a. By thus applying different levels of pressure to the upper and lower surfaces of the metal-made diaphragm 102, the differential pressure therebetween can be detected by the strain detecting section. Note that since the seal ring 103 is disposed in the distal peripheral end of the tubular portion 102b of the diaphragm 102 as mentioned above, there is no need of providing the seal ring 61 shown in FIG. 28. The differential pressure sensor according to this embodiment also makes it possible to constitute a differential pressure sensor using a single diaphragm, as with the embodiment shown in FIG. 28.

Next, a coupling for a hydraulic pipe and a hydraulic pipe itself which have previously had mounted thereon any of the pressure sensor units explained in the foregoing embodiments, will be described.

Figure 31:
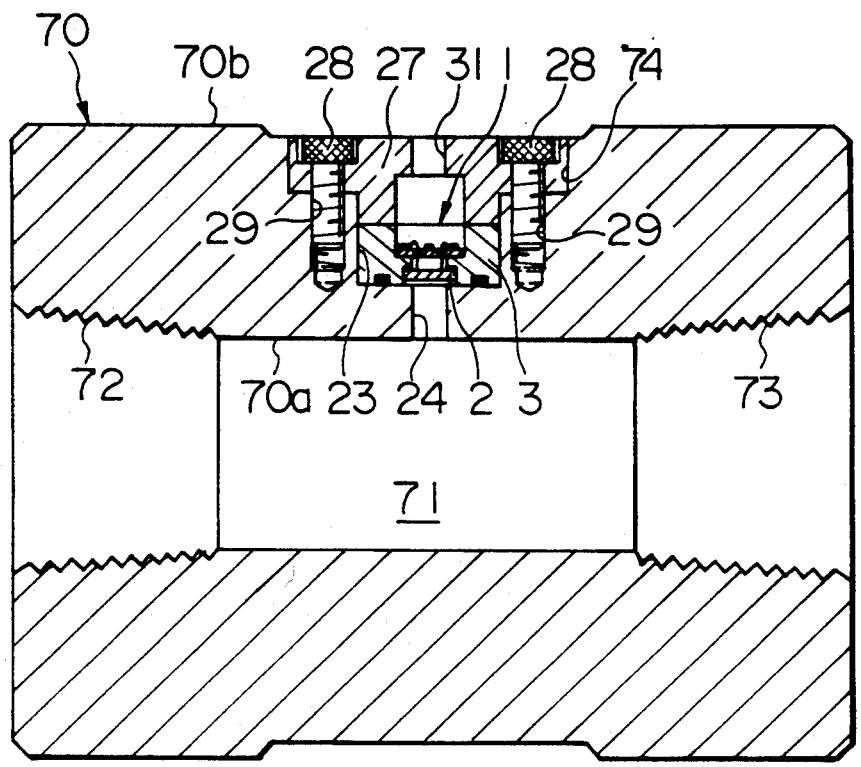
FIG. 31 is a vertical sectional view showing a first embodiment of a hydraulic equipment with the pressure sensor according to the present invention.
Figure 32:
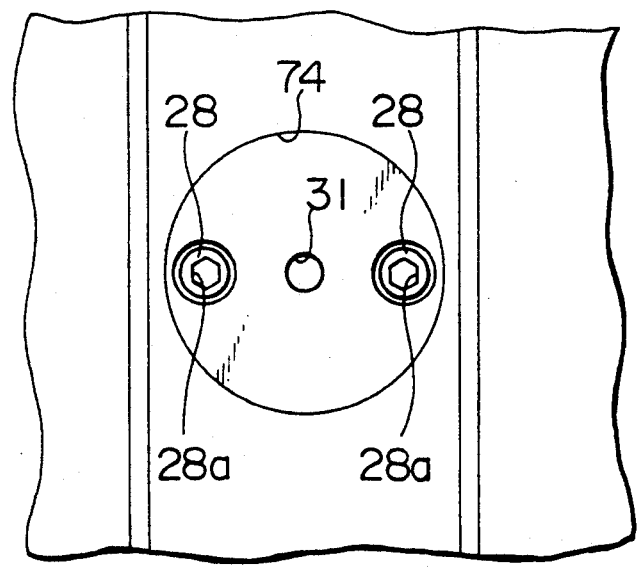
FIG. 32 is an enlarged plan view of a part of FIG. 31.

FIG. 31 shows a first embodiment of such a coupling, and FIG. 32 is a plan view of a part of the coupling. Illustrated in this embodiment is the coupling which mounts thereon the pressure sensor unit 1 having the structure shown in FIG. 5. In FIGS. 31 and 32, the essentially same elements as those shown in FIG. 5 are designated by the same reference numerals. 70 is a bushing adapted to couple a pair of hydraulic pipes different in diameter. The inner circumference of the bushing 70 gives a fluid contact surface 70a in the form of a flat circumferential surface, thereby defining a fluid passage 71. Furthermore, larger-diameter female threads 72, 73 are formed on the inner circumferential surface of the bushing 70 at the axially opposite end portions thereof.

Designated by 23 is a circular bore formed in an outer circumferential surface 70b of the bushing 70 for installing the pressure sensor unit 1 therein, 74 is a circular bore for installing the aforesaid retainer member 27 therein, 28, 28 are bolts for fixing the retainer member 27 in place, 29, 29 are threaded bores in which the bolts 28, 28 are screwed for fastening, and 24 is a bore open to the fluid contact surface 70a for introducing the hydraulic fluid. As shown in FIG. 32, each bolt 28 has a hexagonal slot 28a formed in its top surface. A diaphragm 2 set in the pressure sensor unit 1 is subjected to a hydraulic pressure via the bore 24 for introducing hydraulic fluid. In this way, the pressure sensor unit 1 is mounted or assembled into the wall of the bushing 70 from the outer circumference side and fixed by the retainer member 27. In the drawings, a measuring unit and so on are not illustrated.

The bushing 70 thus constructed provides the structure in which the pressure sensor capable of detecting a pressure of the hydraulic fluid passing through the fluid passage 71 is incorporated into the bushing 70 in advance, and the pressure sensor unit 1 and the retainer member 27 are completely buried in the wall of the bushing 70, thereby enabling to surely prevent rocks, earth and sand, etc. from damaging the pressure sensor. Further, only by replacing the conventional bushing equipped with no pressure sensor by the bushing 70 of this embodiment, the pressure sensor can be mounted without changing the entire length of hydraulic pipes, and the mounting work is very simple. In addition, the measuring point of a hydraulic pressure can be selected freely and easily by modifying a position at which the bushing 70 is connected to the hydraulic pipes.

Figure 33:
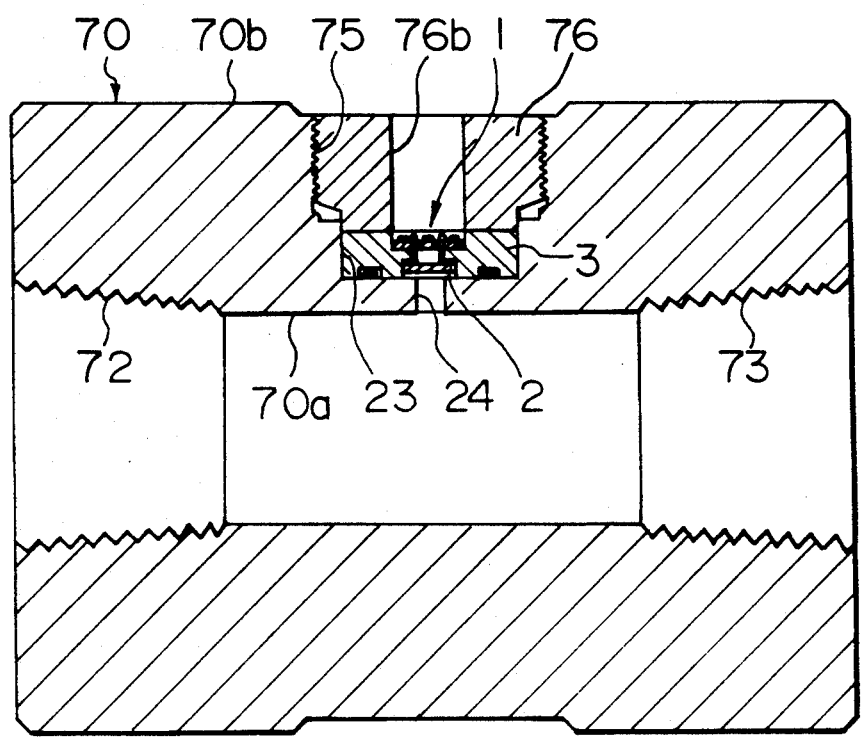
FIG. 33 is a vertical sectional view showing a second embodiment of the hydraulic equipment with the pressure sensor according to the present invention.
Figure 34:
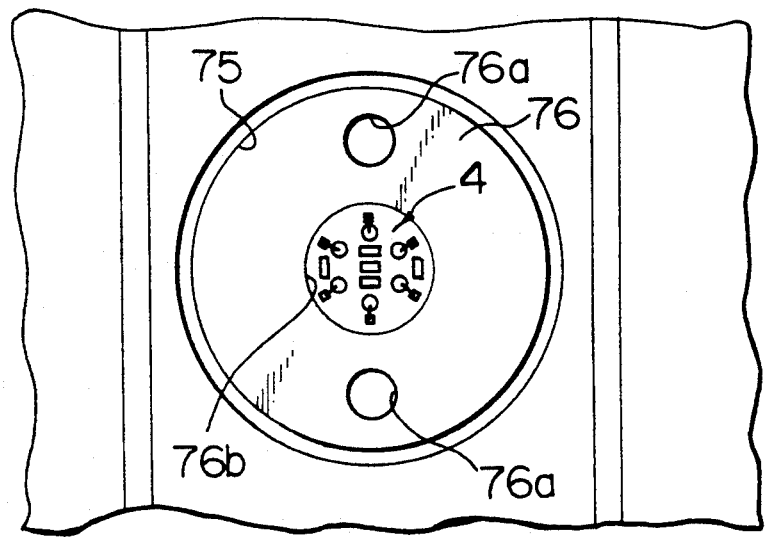
FIG. 34 is an enlarged plan view of a part of FIG. 33.

FIGS. 33 and 34 show another embodiment of the coupling. In this embodiment, the same elements as those shown in FIG. 31 are designated by the same reference numerals and not described here. This embodiment is different from the foregoing embodiment in a retainer member for holding the support member 3 of the pressure sensor unit 1. More specifically, a bore 75 for installing the retainer member therein is formed as a larger-diameter female threaded bore in an upper portion of the installation bore 23 for the pressure sensor unit 1, as viewed on the drawing, and a retainer member 76 having made threads formed in its outer circumferential surface is screwed into the threaded bore 75 for mounting. In the outer end face of the retainer member 76, as shown in FIG. 34, there are provided two bores 76a for rotating the retainer member 76. Further, a penetration bore 76b is formed through a shaft portion of the retainer member 76, and lead wires of the electric circuit section 4 disposed in an upper portion of the pressure sensor unit 1 are drawn via the bore 76b. Afterward, the bore 76b is sealed off.

Figure 35:
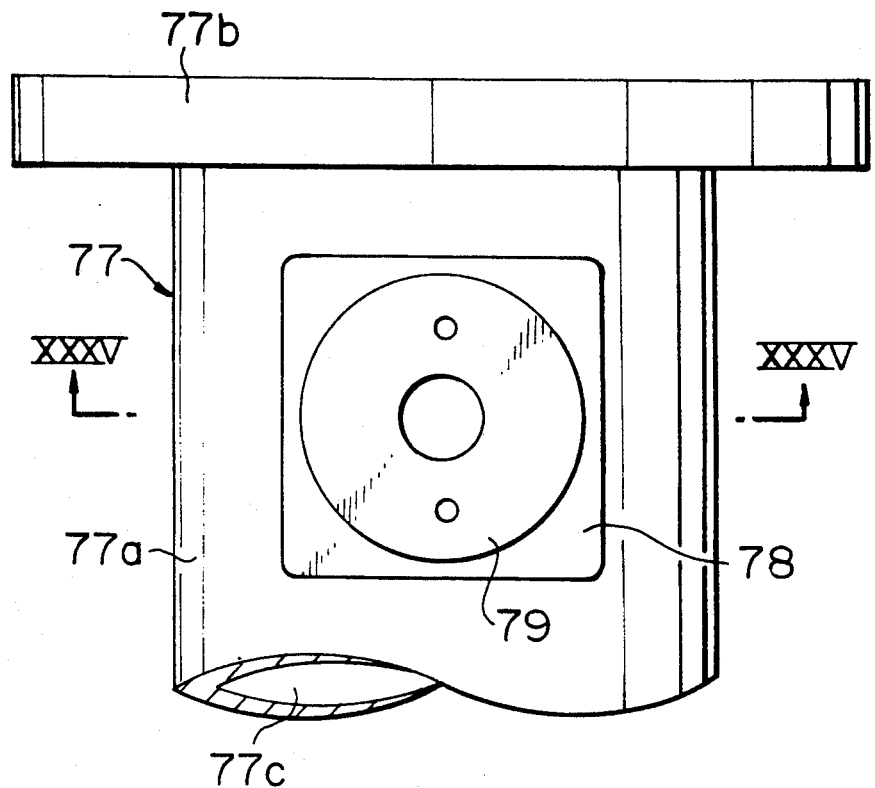
FIG. 35 is a side view showing a third embodiment of the hydraulic equipment with the pressure sensor according to the present invention.
Figure 36:
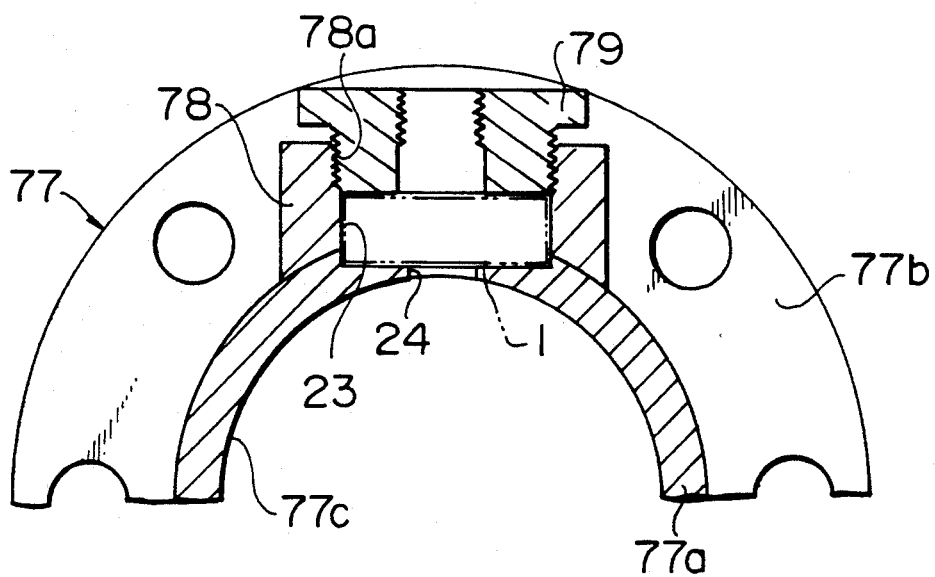
FIG. 36 is a sectional view of taken along the line XXXV—XXXV in FIG. 35.

FIGS. 35 and 36 show an embodiment in which the pressure sensor unit according to the present invention is mounted to a flange portion of a hydraulic pipe. The mounted pressure sensor is assumed to have the structure shown in FIG. 5. Designated by 77 is a hydraulic pipe with a flange, which comprises a pipe portion 77a and a flange portion 77b and has the inner circumference serving as a fluid contact surface 77c. 23 is a bore formed radially from the outer circumferential surface of the pipe portion 77a inward and employed for installing the pressure sensor unit 1 therein. 24 is a bore for introducing the hydraulic fluid. 78 is a holder vertically provided in concentrical relation to the installation bore 23, and formed with female threads 78a in an upper-half portion of its inner circumferential surface. A retainer member 79 for holding and fixing the pressure sensor unit 1 is screwed into the female threads 78a.

With the above embodiment, the hydraulic pressure can be measured at an arbitrary position by mounting the flange equipped hydraulic pipe 77 including the pressure sensor unit 1 at any desired location of hydraulic pipes.

Figure 37:
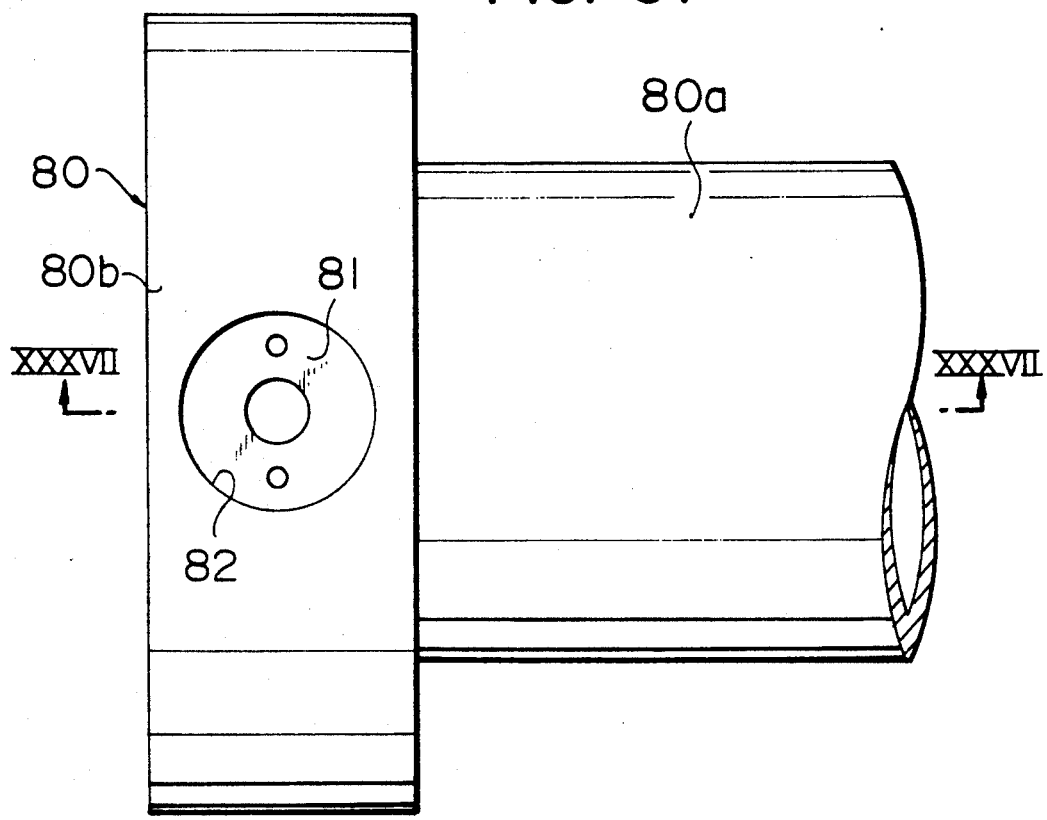
FIG. 37 is a side view showing a fourth embodiment of the hydraulic equipment with the pressure sensor according to the present invention.
Figure 38:
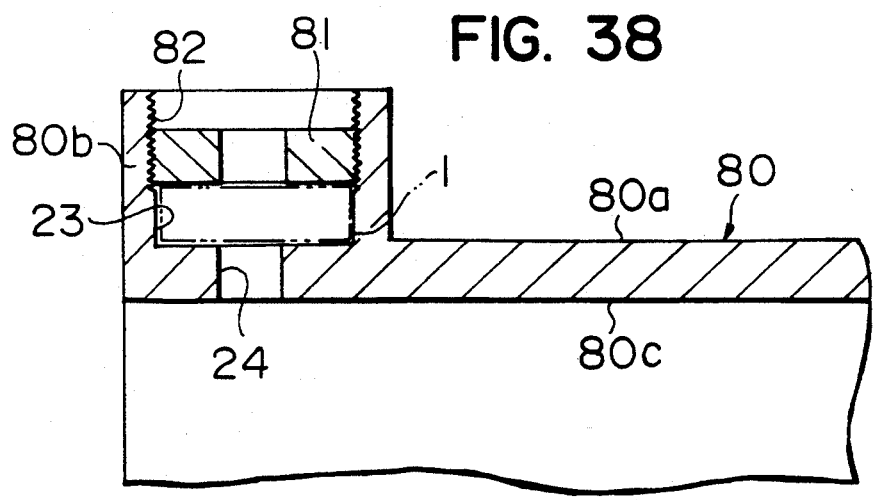
FIG. 38 is a sectional view of taken along the line XXXVII—XXXVII in FIG. 37.

FIGS. 37 and 38 show an embodiment in which the pressure sensor unit according to the present invention is mounted to a flange portion 80b of a flange equipped hydraulic pipe 80 which comprises a hydraulic pipe 80a and the flange portion 80b. In this embodiment, the flange portion 80b is formed with a bore 23 for installing the pressure sensor unit 1 therein, and a female threaded bore 82 coaxially formed with the bore 23 for receiving a retainer member 81 adapted to fix the pressure sensor unit 1 installed. Note that 24 is a bore for introducing the hydraulic fluid and 80c is a fluid contact surface.

Although the pressure sensors according to the foregoing embodiments have been explained as mainly measuring a hydraulic pressure, it should be understood that the present invention is also similarly applicable to a pressure of other liquid or gas.

INDUSTRIAL APPLICABILITY

The pressure sensor and the hydraulic equipment with the pressure sensor according to the present invention have the structure optimum to be mounted on or incorporated in or assembled with hydraulic equipments and the like for civil engineering and construction machines, and make it possible to improve positioning accuracy of respective components such as a diaphragm, facilitate mounting or assembly, and improve accuracy of measuring a pressure. With the manufacture method for the pressure sensor according to the present invention, the semiconductor manufacture technology can be utilized effectively.

What is claimed is:

1. A pressure sensor comprising a diaphragm shaped into the form of a rectangular metal-made thin plate which is formed by severing a metal-made thin plate substrate, having a strain detecting section on one surface, which is manufactured by a thin film step in a semiconductor manufacturing thin film process previous to the severing step, and having at least one surface as a pressure receiving surface; a support member having a circular larger-diameter bore and a circular smaller-diameter bore formed in continuous and coaxial relation to said circular larger-diameter bore, wherein said circular larger-diameter bore receives said diaphragm, the inner wall surface of said circular larger-diameter bore determine an installed position of said diaphragm relative to said circular smaller-diameter bore used as a pressure introduction means by bringing respective apexes of said diaphragm into contact with the inner wall surface of said circular larger-diameter bore, said circular smaller-diameter bore defines a dimension of a strain causing area of said diaphragm, a stepped portion formed between said circular larger-diameter bore and said circular smaller-diameter bore provides a bonding surface to be bonded to said diaphragm, and a pressure medium is introduced to the pressure receiving surface of said diaphragm placed in said circular larger-diameter bore.

2. A pressure sensor according to claim 1, wherein said diaphragm is joined to said support member by an adhesive.

3. A pressure sensor according to claim 1, wherein said support member is a wall in contact with a pressure medium for a hydraulic equipment.

4. A pressure sensor according to claim 1, wherein said support member is arranged to receive and install therein an electric circuit section for processing a detection signal output from said strain detecting section.

5. A pressure sensor comprising two diaphragms each shaped into the form of a thin plate, having a strain detecting section provided on one surface, and using the other surface as a pressure receiving surface, and a support member having two pairs of larger-diameter bores and smaller-diameter bores formed in continuous and coaxial relation to said larger-diameter bores, wherein each of said two pairs of larger-diameter bores receives one of said two diaphragms, the inner wall surface of each said larger-diameter bore determines an installed position of each said diaphragm relative to each said smaller-diameter bore in accordance with the positional relationship of limiting a position of the outer edge of each said diaphragm, each said smaller-diameter bore defines a dimension of a strain causing area of each said diaphragm, a stepped portion formed between each said larger-diameter bore and each said smaller-diameter bore provides a bonding surface to be bonded to each said diaphragm, and pressure media under different levels of pressure are introduced to the pressure receiving surfaces of said diaphragms placed in said larger-diameter bores, whereby said pressure sensor is constituted as a differential pressure sensor.

6. A pressure sensor comprising a diaphragm shaped into the form of a rectangular metal thin plate formed by server from a thin plate substrate, having a strain detecting section provided on one surface, and using both one surface and the other surface as pressure receiving surfaces, and a support member having a larger-diameter bore and a smaller-diameter bore formed in continuous and coaxial relation to said larger-diameter bore, wherein said larger-diameter bore receives said diaphragm, the inner wall surface of said larger-diameter bore contacts apexes of said diaphragm to determine an installed position of said diaphragm relative to said smaller-diameter bore thereby limiting a position of the outer edge of said diaphragm, said smaller-diameter bore defines a dimension of a strain causing area of said diaphragm, a stepped portion formed between said larger-diameter diameter bore and said smaller-diameter bore provides a bonding surface to be bonded to said diaphragm, and pressure media under different levels of pressure are introduced to one surface and the other surface of said diaphragm placed in said larger-diameter bores, whereby said pressure sensor is constituted as a differential pressure sensor.

7. A pressure sensor comprising two diaphragms each shaped into the form of a rectangular metal-made thin plate which is formed by severing a metal-made, thin plate substrate, having a strain detecting section on one surface, which is manufactured by a thin film step in a semiconductor manufacturing thin film process previous to the severing step, and using the other surface as a pressure receiving surface, and a support member having two pairs of circular larger-diameter bores and circular smaller-diameter bores formed in continuous and coaxial relation to said circular larger-diameter bores, wherein each of said pairs of circular larger-diameter bore receives one of said diaphragms, the inner wall surface of each said circular larger-diameter bore determines an installed position of each said diaphragm relative to each said circular smaller-diameter bore used as a pressure introduction means by bringing respective apexes of each said diaphragm into contact with the inner wall surface of each said circular larger-diameter bore, each said circular smaller-diameter bore defines a dimension of a strain causing are of each said diaphragm, a stepped portion formed between each said circular larger-diameter bore and each said circular smaller-diameter bore provides a bonding surface to be bonded to each said diaphragm, and pressure media under different levels of pressure are introduced to the pressure receiving surfaces of said diaphragms placed in said circular larger-diameter bores, whereby said pressure is constituted as a differential pressure sensor.

* * * * *